(12) United States Patent
Yamada

(10) Patent No.: US 10,866,321 B2
(45) Date of Patent: Dec. 15, 2020

(54) IMAGING DEVICE

(71) Applicant: Sony Semiconductor Solutions Corporation, Kanagawa (JP)

(72) Inventor: Hideshi Yamada, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 301 days.

(21) Appl. No.: 15/762,631

(22) PCT Filed: Jun. 5, 2017

(86) PCT No.: PCT/JP2017/020862
§ 371 (c)(1),
(2) Date: Mar. 23, 2018

(87) PCT Pub. No.: WO2018/042801
PCT Pub. Date: Mar. 8, 2018

(65) Prior Publication Data
US 2018/0275278 A1 Sep. 27, 2018

(30) Foreign Application Priority Data
Sep. 1, 2016 (JP) .................................. 2016-171048

(51) Int. Cl.
*G01S 17/89* (2020.01)
*G01C 3/06* (2006.01)
(Continued)

(52) U.S. Cl.
CPC ............... *G01S 17/89* (2013.01); *G01C 3/06* (2013.01); *G01C 3/085* (2013.01); *G01S 7/4814* (2013.01);
(Continued)

(58) Field of Classification Search
None
See application file for complete search history.

(56) References Cited

U.S. PATENT DOCUMENTS

| 9,318,877 | B2 | 4/2016 | Herschbach et al. |
| 2001/0046317 | A1 | 11/2001 | Kamon et al. |

(Continued)

FOREIGN PATENT DOCUMENTS

| JP | 9-005050 A | 1/1997 |
| JP | 2001-337166 A | 12/2001 |

(Continued)

OTHER PUBLICATIONS

International Search Report and English translation thereof dated Sep. 5, 2017 in connection with International Application No. PCT/JP2017/020862.

(Continued)

*Primary Examiner* — Isam A Alsomiri
*Assistant Examiner* — Amir J Askarian
(74) *Attorney, Agent, or Firm* — Wolf, Greenfield & Sacks, P.C.

(57) ABSTRACT

To improve a distance measurement accuracy by combining a plurality of distance measuring methods while avoiding interference of projection light.
A light source projection unit projects intensity-modulated spatial pattern light. A time-of-flight distance measurement camera measures a distance to an object on the basis of a time of flight of a modulated component included in reflected light of the spatial pattern light from the object. A spatial information distance measurement camera measures a distance to the object on the basis of spatial information included in the reflected light. A depth synthesizing unit synthesizes measurement results of the distances in the time-of-flight distance measurement camera and the spatial information distance measurement camera to determine a depth value of each pixel position of an image imaged by the time-of-flight distance measurement camera or the spatial information distance measurement camera.

5 Claims, 20 Drawing Sheets

(51) Int. Cl.
  *G01S 7/481* (2006.01)
  *G01S 17/46* (2006.01)
  *G01S 17/10* (2020.01)
  *G01C 3/08* (2006.01)
  *G01S 11/12* (2006.01)
  *G01S 17/08* (2006.01)

(52) U.S. Cl.
  CPC .............. *G01S 11/12* (2013.01); *G01S 17/08* (2013.01); *G01S 17/10* (2013.01); *G01S 17/46* (2013.01)

(56) References Cited

U.S. PATENT DOCUMENTS

| | | |
|---|---|---|
| 2006/0126054 A1 | 6/2006 | Kamon et al. |
| 2012/0127281 A1* | 5/2012 | Ward .................... G01S 17/894 348/51 |
| 2015/0070684 A1 | 3/2015 | Min et al. |
| 2015/0092258 A1* | 4/2015 | Herschbach ......... H04N 13/254 359/238 |
| 2016/0005179 A1* | 1/2016 | Petyushko ................ G06T 5/50 382/154 |

FOREIGN PATENT DOCUMENTS

| | | | |
|---|---|---|---|
| JP | 2005-077130 A | | 3/2005 |
| JP | 2008-145263 A | | 6/2008 |
| JP | 2008145263 A | * | 6/2008 |
| JP | 2013-104784 A | | 5/2013 |
| WO | WO 2012/137434 A1 | | 10/2012 |

OTHER PUBLICATIONS

International Written Opinion and English translation thereof dated Sep. 5, 2017 in connection with International Application No. PCT/JP2017/020862.

International Preliminary Report on Patentability and English translation thereof dated Mar. 14, 2019 in connection with International Application No. PCT/JP2017/020862.

Extended European Search Report dated Feb. 11, 2020 in connection with European Application No. 17845812.1.

* cited by examiner

IMAGING DEVICE

CROSS-REFERENCE TO RELATED APPLICATIONS

The present application claims the benefit under 35 U.S.C. § 371 as a U.S. National Stage Entry of International Application No. PCT/JP2017/020862, filed in the Japanese Patent Office as a Receiving Office on Jun. 5, 2017, which claims priority to Japanese Patent Application Number JP2016-171048, filed in the Japanese Patent Office on Sep. 1, 2016, each of which applications is hereby incorporated by reference in its entirety.

TECHNICAL FIELD

The present technology relates to an imaging device. Specifically, the present invention relates to an imaging device that measures a distance to an object, a processing method in the imaging device, and a program for causing a computer to execute the processing method.

BACKGROUND ART

In recent imaging devices, technologies for acquiring not only an image signal of an object but also a depth map expressing distance information in units of pixels are used. As a technology for acquiring the distance information, for example, a ToF system of measuring a distance on the basis of a time of flight (ToF) of a modulated component included in reflected light from an object, and a stereo system of measuring a distance according to a shift amount of two images are known. These technologies for acquiring the distance information have advantages and disadvantages. For example, the stereo system has an advantage that the distance to be measured can be adjusted by adjusting a base line length that is the distance between two cameras. Further, distance measurement in a dark place or a non-edged portion can be compensated by adding an active light source. Meanwhile, in the ToF system, the distance is converted from a phase shift and thus calculation is simple but there is a problem that a plurality of measurement results such as multipass is mixed at an edge portion of an object and the distance measurement performance is deteriorated. Therefore, systems combining both the ToF system and the stereo system have been proposed (see, for example, Patent Documents 1 and 2).

CITATION LIST

Patent Document

Patent Document 1: International Publication No. 2012/137434

Patent Document 2: Japanese Patent Application Laid-Open No. 2005-077130

SUMMARY OF THE INVENTION

Problems to Be Solved By the Invention

In the above-described conventional technologies, it is conceivable to integrate the distance information by both the ToF system and the stereo system to spatially synthesize measurement values with accuracy measured by the respective systems, thereby to obtain distance information with high quality. However, if the two measurement values are simply combined, the same scene is projected by two light sources, and the projection light interferes with each other to become noise components, resulting in degraded distance measurement accuracy.

The present technology was made in view of the foregoing, and objective is to improve distance measurement accuracy by combining a plurality of distance measuring methods while avoiding interference of projection light.

Solution to Problems

The present technology has been made to solve the above-described problem, and a first aspect of the present technology is an imaging device including a light source projection unit configured to project intensity-modulated spatial pattern light, a time-of-flight distance measurement camera configured to measure a distance to an object on the basis of a time of flight of a modulated component included in reflected light of the spatial pattern light from the object, a spatial information distance measurement camera configured to measure a distance to the object on the basis of spatial information included in the reflected light, and a depth synthesizing unit configured to synthesize measurement results of the distances in the time-of-flight distance measurement camera and the spatial information distance measurement camera to determine a depth value of each pixel position of an image imaged by the time-of-flight distance measurement camera or the spatial information distance measurement camera. This configuration provides an effect of synthesizing the measurement results of the distances in the time-of-flight distance measurement camera and the spatial information distance measurement camera to improve the distance measurement accuracy.

Further, in the first aspect, the light source projection unit may include a light source generation unit configured to generate an intensity-modulated light source according to a predetermined modulation signal and a predetermined vertical synchronization signal, and an optical element configured to deform the light source according to a spatial position to generate the spatial pattern light. This configuration provides an effect to project the intensity-modulated spatial pattern light.

Further, in the first aspect, each of the time-of-flight distance measurement camera and the spatial information distance measurement camera may generate a depth value of each pixel position and reliability of the depth value as the measurement result, and the depth synthesizing unit may determine the depth value of each pixel position on the basis of magnitude of the reliability in the measurement result. This configuration provides an effect to determine the depth value on the basis of the magnitude of the reliability of the depth values of the time-of-flight distance measurement camera and the spatial information distance measurement camera. In this case, the depth synthesizing unit may select the depth value having highest reliability in the measurement results, for each pixel, to determine the depth value of each pixel position.

Further, in the first aspect, the spatial information distance measurement camera is a stereo camera including two right and left imaging elements, and configured to measure the distance to the object on the basis of a parallax amount in each pixel position obtained from right and left images obtained from the two imaging elements regarding the spatial information included in the reflected light, and a base line length of the two imaging elements. This provides an effect to improve the distance measurement accuracy, using the measurement result of the distance by the stereo camera.

Further, in the first aspect, the spatial information distance measurement camera is a structure light camera configured to measure the distance to the object on the basis of triangulation calculation regarding the spatial information included in the reflected light. This provides an effect to improve the distance measurement accuracy, using the measurement result of the distance by the structure light camera.

Further, in the first aspect, a second time-of-flight distance measurement camera configured to measure a distance to an object on the basis of a time of flight of a modulated component included in reflected light of the spatial pattern light from the object is further included, and the time-of-flight distance measurement camera and the second time-of-flight distance measurement camera may be operated as the spatial information distance measurement camera. This provides an effect to improve the distance measurement accuracy, using the measurement results of the distances in the two time-of-flight distance measurement cameras. In this case, each of the time-of-flight distance measurement camera and the second time-of-flight distance measurement camera may generate a depth value of each pixel position and reliability of the depth value as the measurement result, the time-of-flight distance measurement camera and the second time-of-flight distance measurement camera may generate a depth value of each pixel position and reliability of the depth value as the measurement result as the spatial information distance measurement camera, and the depth synthesizing unit may select the depth value having highest reliability in the measurement results of the time-of-flight distance measurement camera and the second time-of-flight distance measurement camera and the measurement result as the spatial information distance measurement camera, for each pixel, to determine the depth value of each pixel position.

In addition, in the first aspect, the time-of-flight distance measurement camera and the spatial information distance measurement camera may be an integrated camera that measures the distance to the object on the basis of the time of flight of a modulated component included in reflected light, and measure the distance to the object on the basis of triangulation calculation regarding the spatial information included in the reflected light. This provides an effect to improve the distance measurement accuracy, using a plurality of the measurement results by the integrated camera.

Effects of the Invention

According to the present technology, a superior effect to improve the distance measurement accuracy by a combination of a plurality of distance measuring methods while avoiding interference of projection light can be exhibited. Note that the effects described here are not necessarily limited, and any of effects described in the present disclosure may be exhibited.

MODE FOR CARRYING OUT THE INVENTION

Hereinafter, modes for implementing the present technology (hereinafter referred to as embodiments) will be described. Description will be given according to the following order.

1. First embodiment (example using ToF camera and stereo camera)
2. Second embodiment (example using ToF camera and monocular camera)
3. Third embodiment (example using ToF camera and structure light camera)
4. Fourth embodiment (example using two ToF cameras)
5. Fifth embodiment (example in which ToF camera and structure light camera are integrated)
6. Application example to moving body
7. Application example to endoscope surgery system

1. First Embodiment

[Configuration of Imaging Device]

Figure 1:
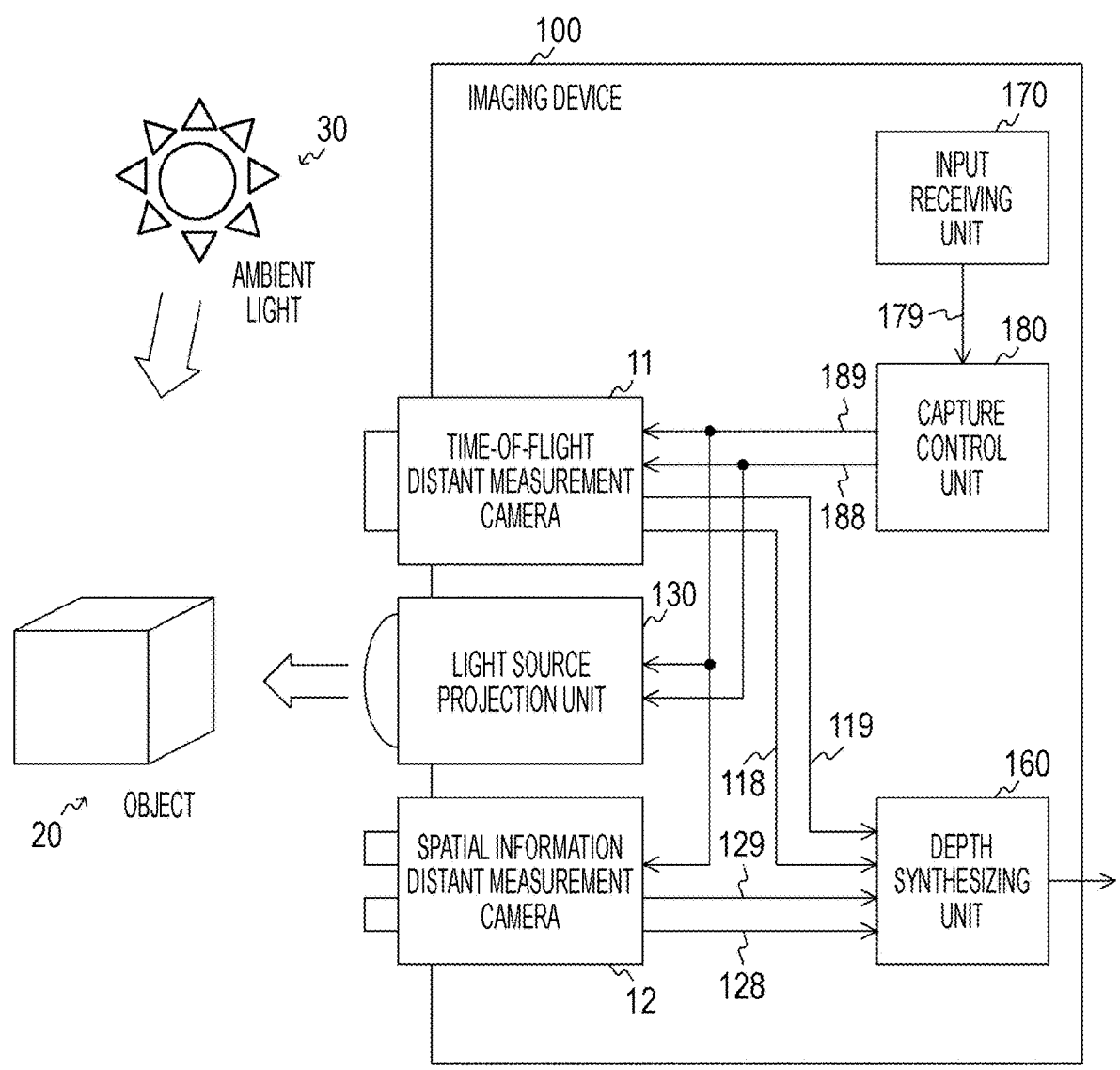
FIG. 1 is a diagram illustrating a configuration example of an imaging device 100 according to an embodiment of the present technology.

FIG. 1 is a diagram illustrating a configuration example of an imaging device 100 according to an embodiment of the present technology. The imaging device 100 images an object 20 to acquire an image signal and distance information of the object. The imaging device 100 includes a time-of-flight distance measurement camera 11, a spatial information distance measurement camera 12, a light source projection unit 130, a depth synthesizing unit 160, an input receiving unit 170, and a capture control unit 180.

The time-of-flight distance measurement camera 11 is a camera that measures a distance to an object on the basis of time of flight of a modulated component included in reflected light from the object. The spatial information distance measurement camera 12 is a camera that measures a distance to an object on the basis of spatial information included in the reflected light from the object. The time-of-flight distance measurement camera 11 and the spatial information distance measurement camera 12 generate captured images and generate a depth map in which distance information is expressed in units of pixels, similarly to normal cameras. Hereinafter, description of the captured images is omitted, and description will be given focusing on handling of the distance information.

The light source projection unit 130 projects light necessary for distance measurement in the time-of-flight distance measurement camera 11 and the spatial information distance measurement camera 12. Here, the time-of-flight distance measurement camera 11 measures a distance using modulated light, and thus a light source needs to include a modulated component. Meanwhile, the spatial information distance measurement camera 12 measures a distance using spatial information, and a light source needs to include a spatial pattern. As described above, in a case of simply projecting the two light sources, projection light of interferes with each other, and the distance measurement accuracy may be deteriorated. Therefore, the light source projection unit 130 projects intensity-modulated spatial pattern light with one light source. Note that the object 20 may be irradiated with ambient light.

The depth synthesizing unit 160 synthesizes measurement results of the distances in the time-of-flight distance measurement camera 11 and the spatial information distance measurement camera 12 to determine depth values of pixel positions of a captured image. The depth synthesizing unit 160 receives a depth value and its reliability from the time-of-flight distance measurement camera 11 via signal lines 119 and 118. Further, the depth synthesizing unit 160 receives a depth value and its reliability from the spatial information distance measurement camera 12 via signal lines 129 and 128.

The input receiving unit 170 receives an input from an outside. As the input receiving unit 170, for example, a capture button or the like for receiving inputs of a capture start command and a capture end command is assumed. The input receiving unit 170 supplies the received inputs to the capture control unit 180 via a signal line 179.

The capture control unit 180 controls a projection operation in the light source projection unit 130 and controls capture operations in the time-of-flight distance measurement camera 11 and the spatial information distance measurement camera 12. Control signals from the capture control unit 180 to the light source projection unit 130, the time-of-flight distance measurement camera 11 and the spatial information distance measurement camera 12 are supplied via signal lines 188 and 189.

Figure 2:
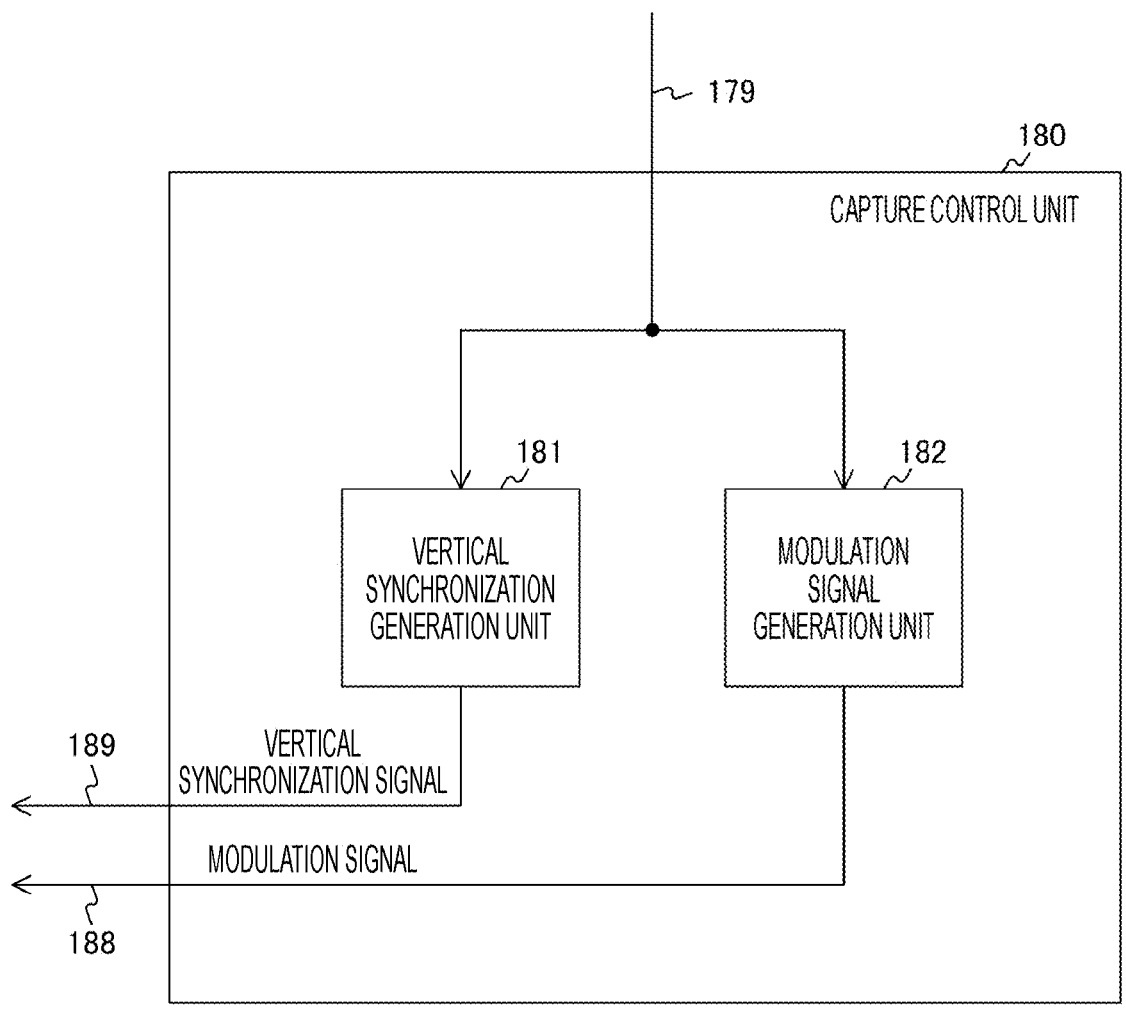
FIG. 2 is a diagram illustrating a configuration example of a capture control unit 180 according to an embodiment of the present technology.

FIG. 2 is a diagram illustrating a configuration example of the capture control unit 180 according to an embodiment of the present technology. The capture control unit 180 includes a vertical synchronization generation unit 181 and a modulation signal generation unit 182. When receiving, for example, the input of the capture start command or the capture end command in the input receiving unit 170, the vertical synchronization generation unit 181 and the modulation signal generation unit 182 detect the reception via the signal line 179 and perform a predetermined operation.

The vertical synchronization generation unit 181 generates a vertical synchronization (V synchronization) signal necessary for capture. The vertical synchronization signal is a signal necessary for capturing a moving picture frame at fixed intervals and is usually a signal having a cycle of about 30 to 120 Hz. The vertical synchronization generation unit 181 starts an output of the vertical synchronization signal when the capture start command is input, and terminates the output of the vertical synchronization signal when the capture end command is input. The vertical synchronization signal is supplied to the light source projection unit 130, the time-of-flight distance measurement camera 11, and the spatial information distance measurement camera 12 via the signal line 189.

The modulation signal generation unit 182 generates a modulation signal necessary for capture. The modulation signal is a signal necessary for distance measurement in the time-of-flight distance measurement camera 11 and is a signal having a cycle of about 20 to 100 MHz. The modulation signal generation unit 182 starts an output of the modulation signal when the capture start command is input, and terminates the output of the modulation signal when the capture end command is input. The modulation signal is supplied to the light source projection unit 130 and the time-of-flight distance measurement camera 11 via the signal line 188.

Figure 3:
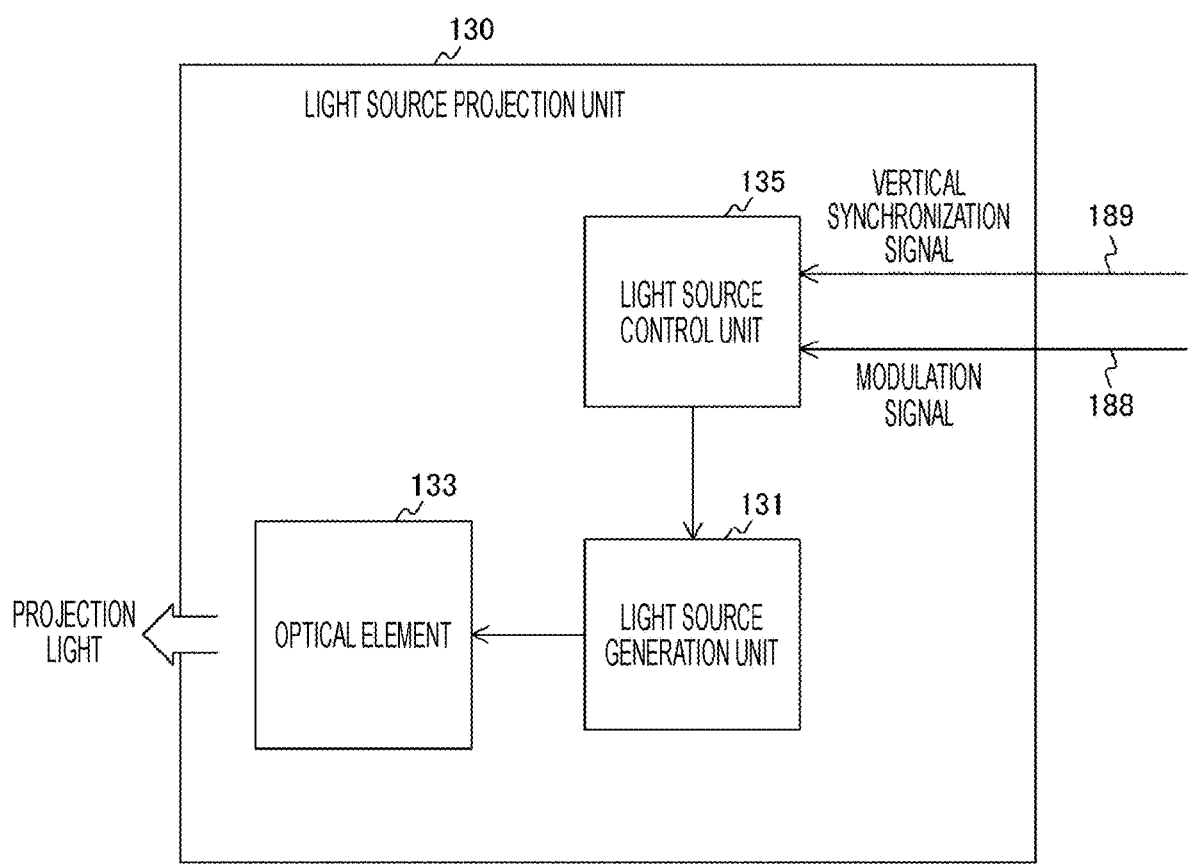
FIG. 3 is a diagram illustrating a configuration example of a light source projection unit 130 according to an embodiment of the present technology.

FIG. 3 is a diagram illustrating a configuration example of the light source projection unit 130 according to an embodiment of the present technology. The light source projection unit 130 includes a light source generation unit 131, an optical element 133, and a light source control unit 135.

The light source generation unit 131 generates a light source for generating projection light. As the light source generation unit 131, for example, a light emitting diode (LED), a laser diode or the like can be used. The light source generation unit 131 generates a light source in which the intensity is modulated according to the modulation signal supplied from the light source control unit 135. The light source generation unit 131 generates non-modulated fixed light while the modulation signal is not supplied. The start and end of the light source generation are also according to projection start and end instructions from the light source control unit 135.

The optical element 133 deforms the light source from the light source generation unit 131 according to a spatial position to generate spatial pattern light. As the spatial pattern light, a lattice pattern, a random point set or projection of random shade, projection to change the point shape according to the distance, or the like is assumed, for example, and can be arbitrarily designed.

The light source control unit 135 controls the light source generation unit 131 according to the modulation signal and the vertical synchronization signal supplied from the capture control unit 180 via the signal lines 188 and 189. Immediately after receiving the vertical synchronization signal, the light source control unit 135 controls the light source generation unit 131 to generate the intensity-modulated light source according to the modulation signal. Then, when an exposure time of the time-of-flight distance measurement camera 11 has passed from reception timing of the vertical synchronization signal, the light source control unit 135 stops supply of the modulation signal and controls the light source generation unit 131 to generate the non-modulated fixed light. After that, when an exposure time of the spatial information distance measurement camera 12 has passed, the light source control unit 135 controls the light source generation unit 131 to terminate generation of the light source.

In this way, the intensity-modulated projection light continues for the exposure time of the time-of-flight distance measurement camera 11. The spatial information distance measurement camera 12 can measure the distance with any of modulated projection light or non-modulated fixed light. Therefore, in a case where the exposure of the time-of-flight distance measurement camera 11 is completed earlier, the fixed light is projected during a remaining exposure time of the spatial information distance measurement camera 12. This is because the modulated light is pulsed light and the projection time with respect to the total time is half, and the light amount is halved for the spatial information distance measurement camera 12, and thus capture can be performed with better sensitivity with the projection by fixed light.

Figure 4:
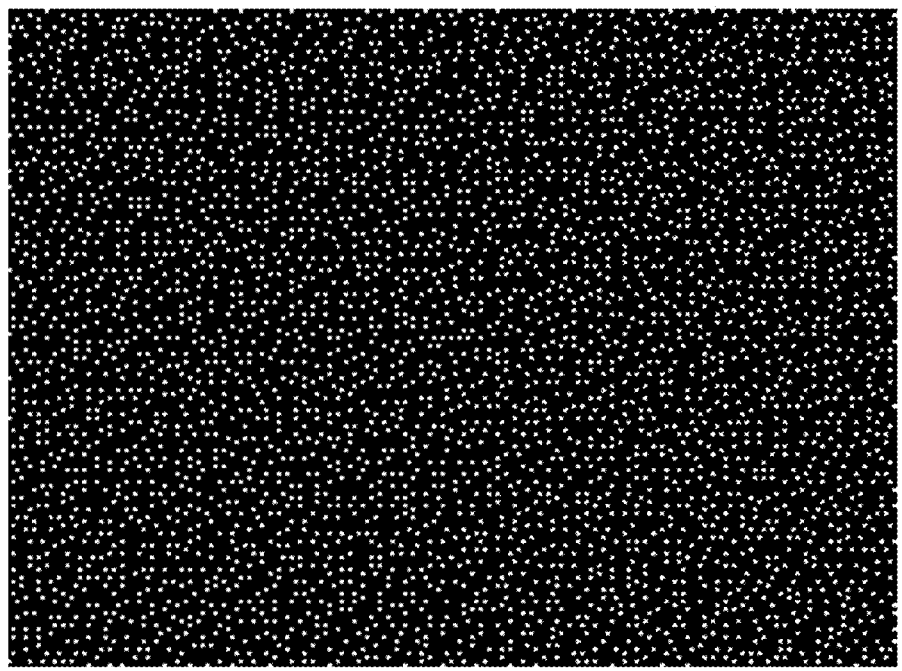
FIG. 4 is a diagram illustrating an example of a mode of spatial pattern light according to an embodiment of the present technology.

FIG. 4 is a diagram illustrating an example of a mode of the spatial pattern light according to an embodiment of the present technology. An arbitrary pattern can be used as the spatial pattern light in the embodiment of the present technology. Here, as an example, a dot pattern is illustrated.

As the optical element 133, for example, a diffraction grating for projecting such a dot pattern is used. In such a diffraction grating, a microstructure is built in a surface of the diffraction grating in accordance with characteristics of the diffraction grating to guide photons so as to transform a beam shape of a laser light source into a free shape. The diffraction grating is manufactured by etching quartz glass or glass material or embossing polymer material. Further, depending on the design of the diffraction grating, it is also possible to cause the point shape to change according to the distance. For example, the light can be made closer to plane light in a nearer view and can focus on a point as the distance is increased. Further, focusing on the point can extend the projection distance.

Further, the spatial pattern light may be slit light. Alternatively, slit lights having a plurality of frequency may be switched by time division.

Figure 5:
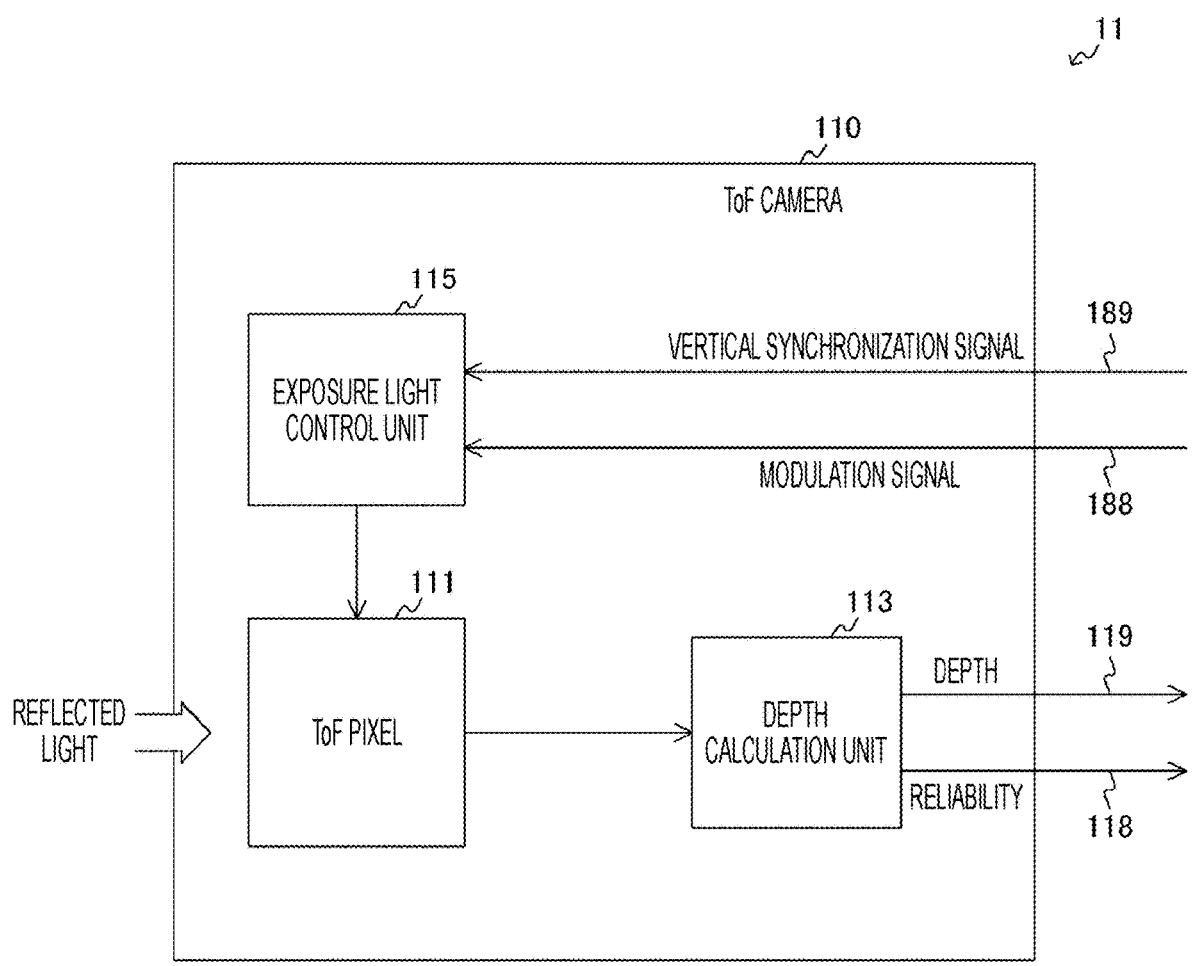
FIG. 5 is a diagram illustrating a configuration example of a ToF camera 110 according to a first embodiment of the present technology.

FIG. 5 is a diagram illustrating a configuration example of a ToF camera 110 according to the first embodiment of the present technology. In the first embodiment, as time-of-flight distance measurement camera 11, a time of flight (ToF) camera 110 is assumed. The ToF camera 110 includes a ToF pixel 111, a depth calculation unit 113, and an exposure control unit 115.

The exposure control unit 115 controls exposure of the ToF pixel 111 according to the modulation signal and the vertical synchronization signal supplied from the capture control unit 180 via the signal lines 188 and 189. When receiving the vertical synchronization signal, the exposure control unit 115 controls the ToF pixel 111 to start exposure. Then, when an exposure time of the ToF camera 110 has passed from reception timing of the vertical synchronization signal, the exposure control unit 115 controls the ToF pixel 111 to terminate the exposure.

The ToF pixel 111 receives modulated reflected light bounding off the object 20 and photoelectrically converts the reflected light as an image signal. In photoelectrically converting the reflected light, the ToF pixel 111 integrates charges in two windows of a pure phase and a reversed phase with one pixel, as described below.

The depth calculation unit 113 obtains a phase delay amount (phase shift amount) from a correlation between the image signal generated by the ToF pixel 111 and the modulation signal, and converts the phase delay amount into a depth value representing the depth. Further, the depth calculation unit 113 generates reliability of the depth value. The depth value and its reliability generated by the depth calculation unit 113 are supplied to the depth synthesizing unit 160 via the signal lines 119 and 118.

Figure 6:
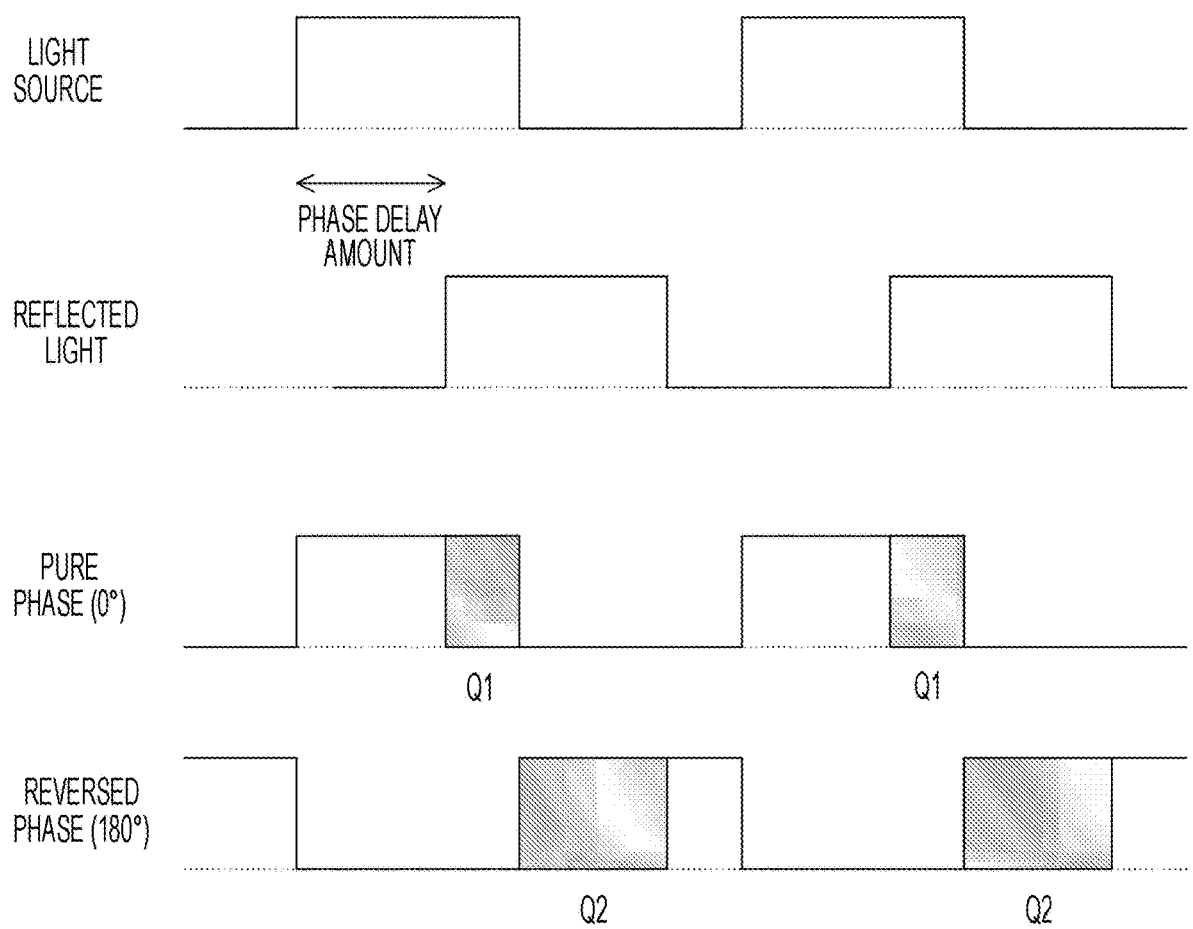
FIG. 6 is a diagram illustrating a pulse method as an example of a distance measuring method according to an embodiment of the present technology.

FIG. 6 is a diagram illustrating a pulse method as an example of a distance measuring method according to an embodiment of the present technology. The light source projection unit 130 projects a pulse wave matched with a modulation frequency of the modulation signal for a certain period ($\Delta t$). The projection light reflected from the object 20 is observed by the ToF camera 110 with a delay of a phase delay amount ($\varphi$). At this time, the ToF pixel 111 integrates and measures the reflected light in two windows of a normal phase (0°) and a reversed phase (180°) synchronized with the pulse wave projected from the light source projection unit 130 (Q1 and Q2). A distance d to the object 20 can be calculated by the following expression using the measured electric charges Q1 and Q2. Note that c is the speed of light.

$$d = (\tfrac{1}{2}) \cdot c \cdot \Delta t \cdot (Q2/(Q1+Q2))$$

At this time, a total value of the electric charges Q1 and Q2 is the intensity of the reflected light from the object 20, and this value is used as the reliability, on the basis of an idea that a signal-noise ratio (SN ratio) of the signal is better when stronger response is obtained. That is, the reliability r is obtained by the following expression.

$$r = Q1 + Q2$$

Note that, here, the pulse method has been described here as an example of the distance measuring method. However, other methods such as a continuous wave method may be used.

Figure 7:
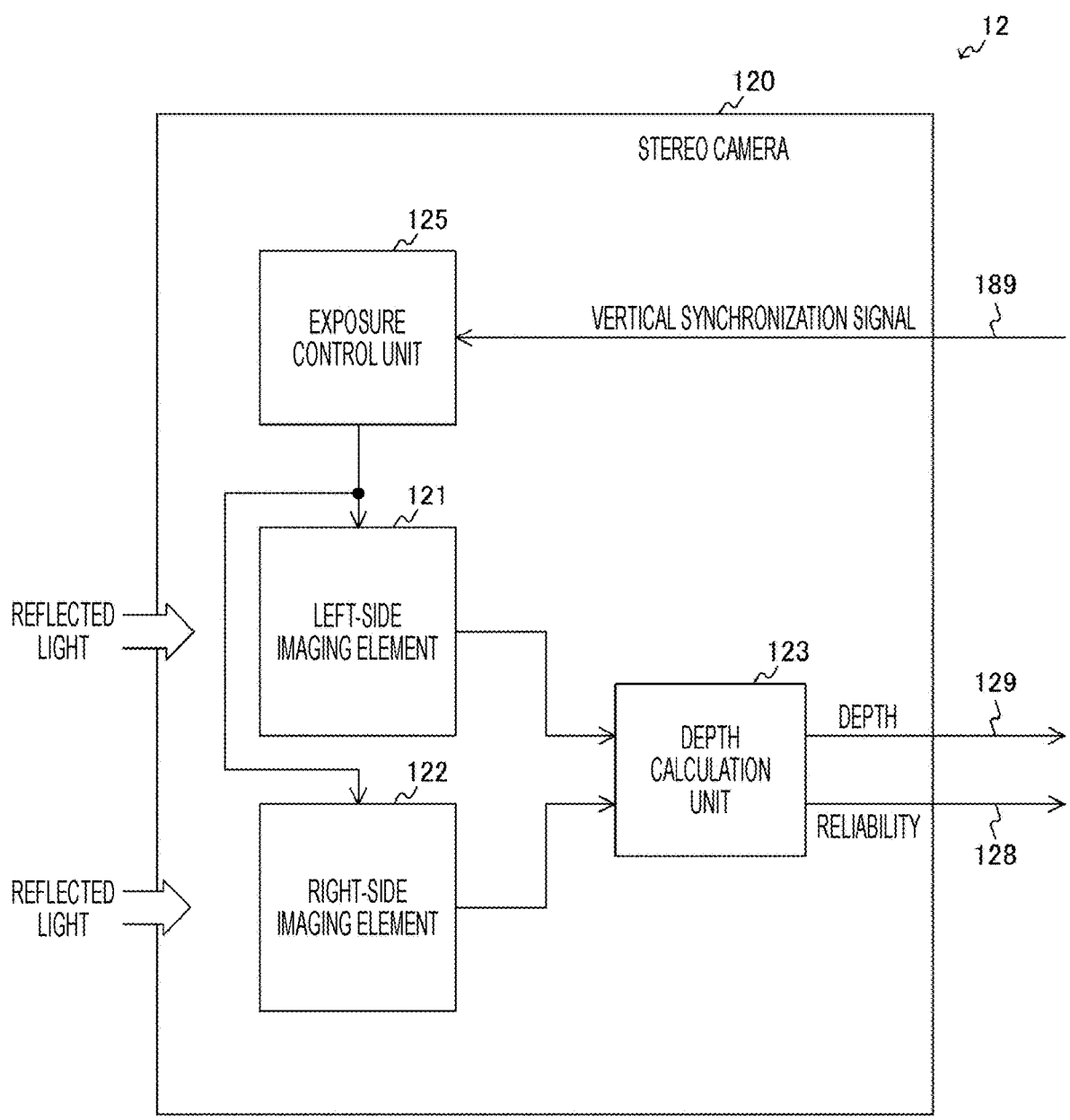
FIG. 7 is a diagram illustrating a configuration example of a stereo camera 120 according to the first embodiment of the present technology.

FIG. 7 is a diagram illustrating a configuration example of a stereo camera 120 according to the first embodiment of the present technology. In the first embodiment, as the spatial information distance measurement camera 12, a stereo camera 120 is assumed. The stereo camera 120 includes a left-side imaging element 121, a right-side imaging element 122, a depth calculation unit 123, and an exposure control unit 125.

The exposure control unit 125 controls exposure of the left-side imaging element 121 and the right-side imaging element 122 according to a vertical synchronization signal supplied from the capture control unit 180 via the signal line 189. When receiving the vertical synchronization signal, the exposure control unit 125 controls the left-side imaging element 121 and the right-side imaging element 122 to start exposure. Then, when an exposure time of the stereo camera 120 has passed from reception timing of the vertical synchronization signal, the exposure control unit 125 controls the left-side imaging element 121 and the right-side imaging element 122 to terminate the exposure.

The left-side imaging element 121 and the right-side imaging element 122 receive the reflected light bouncing off the object 20 and photoelectrically convert the reflected light as image signals of left and right images.

The depth calculation unit 123 calculates a parallax amount at each pixel position from the left and right images, calculates a distance on the basis of a base line length between the left-side imaging element 121 and the right-side imaging element 122, and outputs the calculated distance. To calculate the parallax amount, a block matching method can be used, in which, regarding which position a patch image of N×N pixels including a pixel of interest in one of the images appears as a similar patch image in the other image, a patch image with a minimum error is searched for while shifting the position.

In a case where the object is a flat portion having no pattern of a patch image, the stereo camera 120 may not be able to successfully obtain the distance. However, if the light projected by the pattern light is observed with sufficient contrast, the parallax amount can be calculated using the pattern of the pattern light as a clue.

Further, since the stereo camera 120 can improve the accuracy of the depth value by calculating the shift amount of the patch image with finer precision than the pixel, the accuracy of the depth value can be improved by increasing the resolutions of the left-side imaging element 121 and the right-side imaging element 122. Further, a range of measurable distance can be adjusted by adjusting the base line length between the left-side imaging element 121 and the right-side imaging element 122.

In this manner, the stereo camera 120 receives the vertical synchronization signal from the capture control unit 180 and controls capture of the left-side imaging element 121 and the right-side imaging element 122. Then, the depth calculation unit 123 calculates the parallax amount from the captured left and right images, determines the depth value of each pixel position, and outputs the depth values as a depth map. Further, the depth calculation unit 123 outputs the reliability obtained in the calculation process.

The amount of parallax can be calculated by the following absolute value difference expression, for example. A patch absolute value difference $R_{SAD}$ is a value obtained by integrating an absolute difference between a pixel value of a pixel $I(i, j)$ of the patch of an image L and a pixel value of a pixel $T(i, j)$ of the patch of an image R by the amount of pixels in the patch. The value of the patch absolute value difference $R_{SAD}$ is decreased as the patch images are similar. A minimum patch absolute value difference is obtained while shifting a reference position of the patch of the image L by the shift amount. The shift amount at the time of the minimum difference is the parallax, and is the depth value at that position.

$$R_{SAD} = \sum_{j=0}^{N-1} \sum_{i=0}^{N-1} |I(i, j) - T(i, j)| \quad \text{[Expression 1]}$$

Further, the reliability can be calculated as a ratio between the minimum value and a second minimum value, for example. A reliability $C_{SAD}$, which is a value obtained by subtracting 1 from the ratio is obtained, where the minimum absolute value difference is $R_{SAD1}$ and the second minimum absolute value at a different shift position from the minimum absolute value difference is $R_{SAD2}$. This value becomes larger as the difference between the two reliabilities becomes larger, and the shift amount can be distinguished from other shift amounts as the difference is larger.

$$C_{SAD} = 1.0 - R_{SAD1}/R_{SAD2}$$

Figure 8:
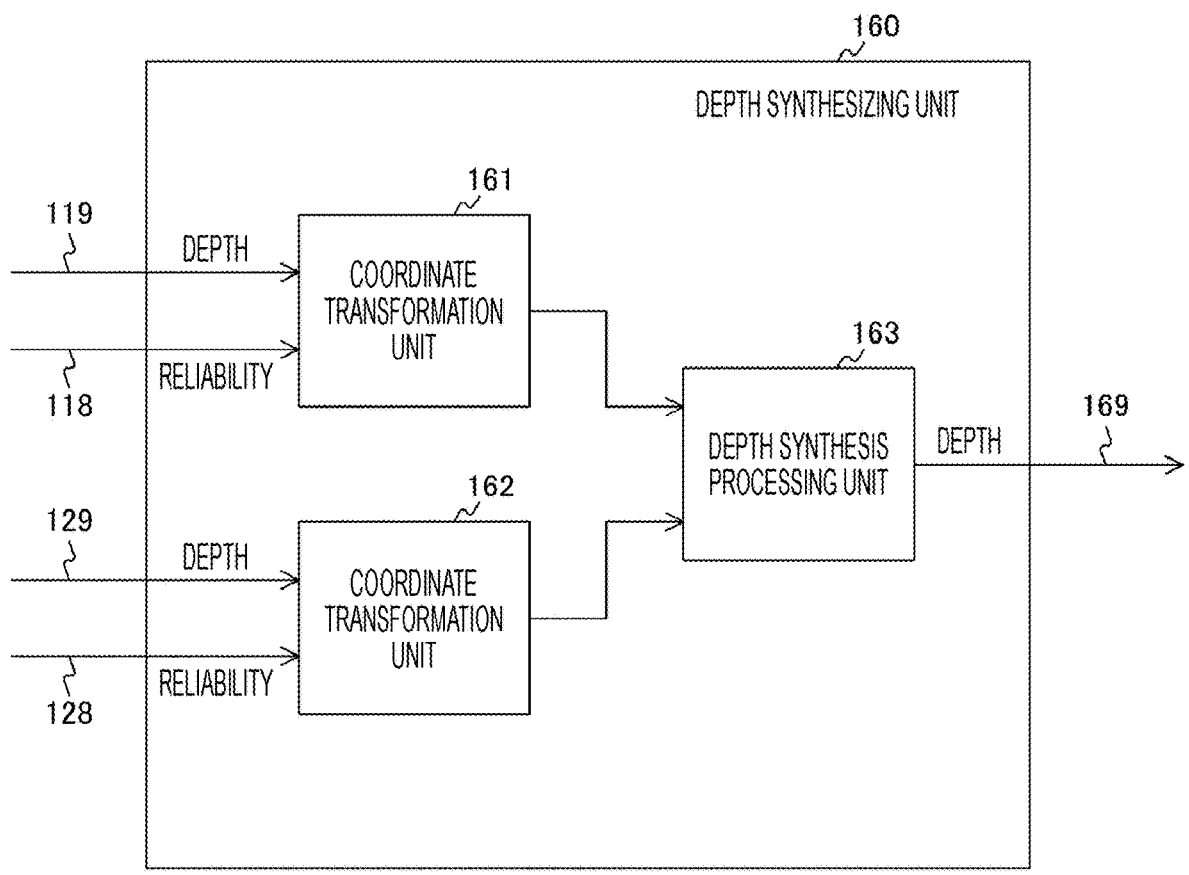
FIG. 8 is a diagram illustrating a configuration example of a depth synthesizing unit 160 according to the first embodiment of the present technology.

FIG. 8 is a diagram illustrating a configuration example of the depth synthesizing unit 160 according to the first embodiment of the present technology. The depth synthesizing unit 160 includes coordinate transformation units 161 and 162 and a depth synthesis processing unit 163.

The coordinate transformation unit 161 applies a coordinate transformation operation to the depth value and the reliability supplied from the time-of-flight distance measurement camera 11 via the signal lines 119 and 118 to perform processing of aligning coordinate positions of the depth map.

The coordinate transformation unit 162 applies a coordinate transformation operation to the depth value and the reliability supplied from the spatial information distance measurement camera 12 via the signal lines 129 and 128 to perform processing of aligning coordinate positions of the depth map.

The depth synthesis processing unit 163 integrates and outputs the two depth value, coordinate positions of which are aligned by the coordinate transformation units 161 and 162, on the basis of the magnitude of the reliability. For example, depth synthesis can be performed selecting the depth value with the highest reliability for each pixel.

Since parameters necessary for the coordinate transformation are determined according to the camera positions of the time-of-flight distance measurement camera 11 and the spatial information distance measurement camera 12, calibration is performed in advance and obtains the parameters, and values of the parameters are used. The parameters are called, for example, external parameter of the camera, internal parameter, and rectification parameter, and are generally expressed by the following forms.

The internal parameter is expressed by the determinant of the following expression. Note that $f_x$ and $f_y$ are focal lengths expressed in units of pixels. $c_x$ and $c_y$ are principal points of the cameras.

$$\begin{bmatrix} f_x & 0 & c_x \\ 0 & f_y & c_y \\ 0 & 0 & 1 \end{bmatrix} \quad \text{[Expression 2]}$$

The external parameters are expressed by the following determinant. Note that r is an element of a rotation matrix, and t is an element of translational movement. The determinant is a simultaneous transformation matrix putting these elements together.

$$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \quad \text{[Expression 3]}$$

The rectification parameter is nine parameters of a 3×3 matrix, in which the camera is collimated and a search such as block matching is obtained on an epipolar straight line.

The imaging device according to the first embodiment needs setting in consideration of measuring ranges of the ToF camera 110 and the stereo camera 120. That is, in the ToF camera 110, a modulation frequency determines a measurement resolution and a limit measurement distance, and the intensity and the exposure time of the modulated light determine the distance to an object to be measured. If the intensity of the modulated light is strong or the exposure time is long, the light reaches a further distance, but near objects may be observed in a saturated manner and the distance may not be able to be measured. Meanwhile, in the stereo camera 120, the base line length between the left-side imaging element 121 and the right-side imaging element 122 determines the measurement resolution and the limit measurement distance, and the intensity and the exposure time of the projection pattern light determine the distance to the object to be measured.

Typically, a ToF camera has a low resolution, and a stereo camera having a high resolution such as a sensor for capturing photos and moving images is often used. Therefore, it is conceivable to obtain a synthesized depth map, setting the ToF camera 110 for a near view and the stereo camera 120 for a distant view.

As for the exposure time, it is conceivable to set the ToF camera 110 to a short exposure time and the stereo camera 120 to a long exposure time. By setting in this way, a short-distance ToF depth map and a long-distance stereo depth map can be obtained. With the settings, there are effects to reduce perforation of a planar portion occurring in the stereo camera due to the pattern light, and to increase the projection intensity by focusing on a point light source rather than to a surface light source. Therefore, distance measurement with a wide dynamic range in the distance direction becomes possible.

In this way, by realizing the distance measurement using modulation and the distance measurement using the pattern with one light source, the projection light can be used without waste, and it is more advantageous than a simple combination of two distance measurement systems in terms of power consumption. Also, interference noise due to two different light sources can be avoided. Also, the smaller the light source, the smaller the module size, which is also advantageous in terms of size and cost.

[Operation of Imaging Device]

Figure 9:
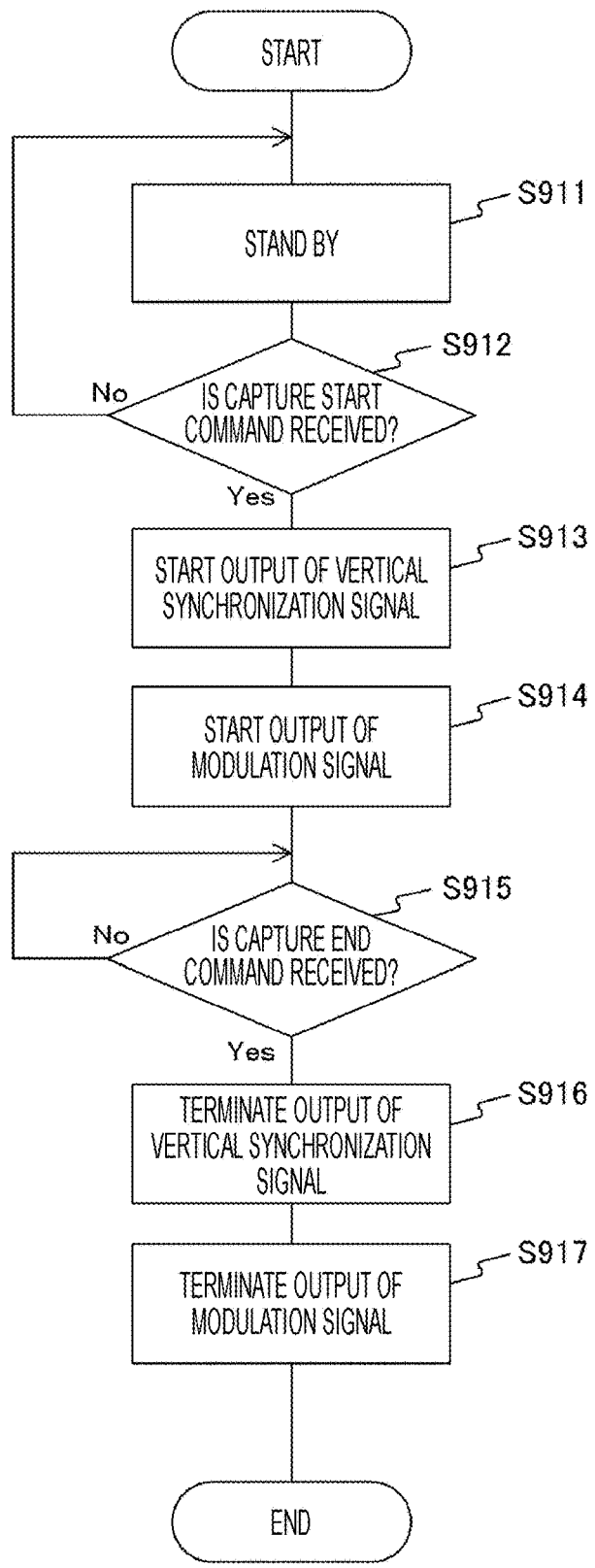
FIG. 9 is a flowchart illustrating an operation procedure example of the capture control unit 180 according to the embodiment of the present technology.

FIG. 9 is a flowchart illustrating an operation procedure example of the capture control unit 180 according to an embodiment of the present technology.

Before receiving the capture start command (step S912: No), the capture control unit 180 is in a standby state (step S911). When the capture start command is input (step S912: Yes), the vertical synchronization generation unit 181 starts an output of the vertical synchronization signal (step S913), and the modulation signal generation unit 182 starts an output of the modulation signal (step S914).

After that, when the capture end command is input (step S915: Yes), the vertical synchronization generation unit 181 terminates the output of the vertical synchronization signal (step S916), and the modulation signal generation unit 182 terminates the output of the modulation signal (step S917).

Figure 10:
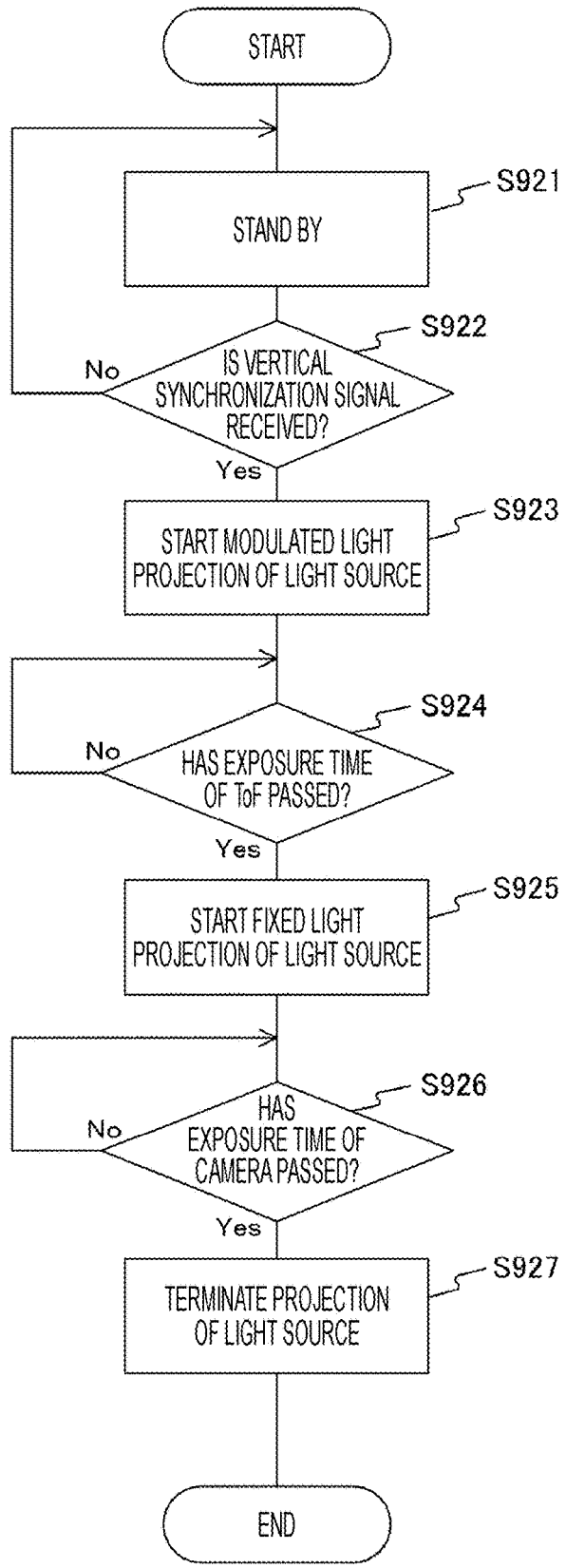
FIG. 10 is a flowchart illustrating an operation procedure example of the light source projection unit 130 in the embodiment of the present technology.

FIG. 10 is a flowchart illustrating an operation procedure example of the light source projection unit 130 in the embodiment of the present technology.

Before receiving the vertical synchronization signal (step S922: No), the light source projection unit 130 is in a standby state (step S921). When the vertical synchronization signal is input (step S922: Yes), the light source generation unit 131 generates an intensity-modulated light source, and projection by the modulated light is started (step S923).

After that, when the exposure time of the time-of-flight distance measurement camera 11 has passed from the reception timing of the vertical synchronization signal (step S924: Yes), the light source generation unit 131 generates non-modulated fixed light, and projection with the fixed light is started (step S925).

After that, when the exposure time of the spatial information distance measurement camera 12 has passed (step S926: Yes), the light source generation unit 131 stops the generation of the light source, and the projection is terminated (step S927).

Figure 11:
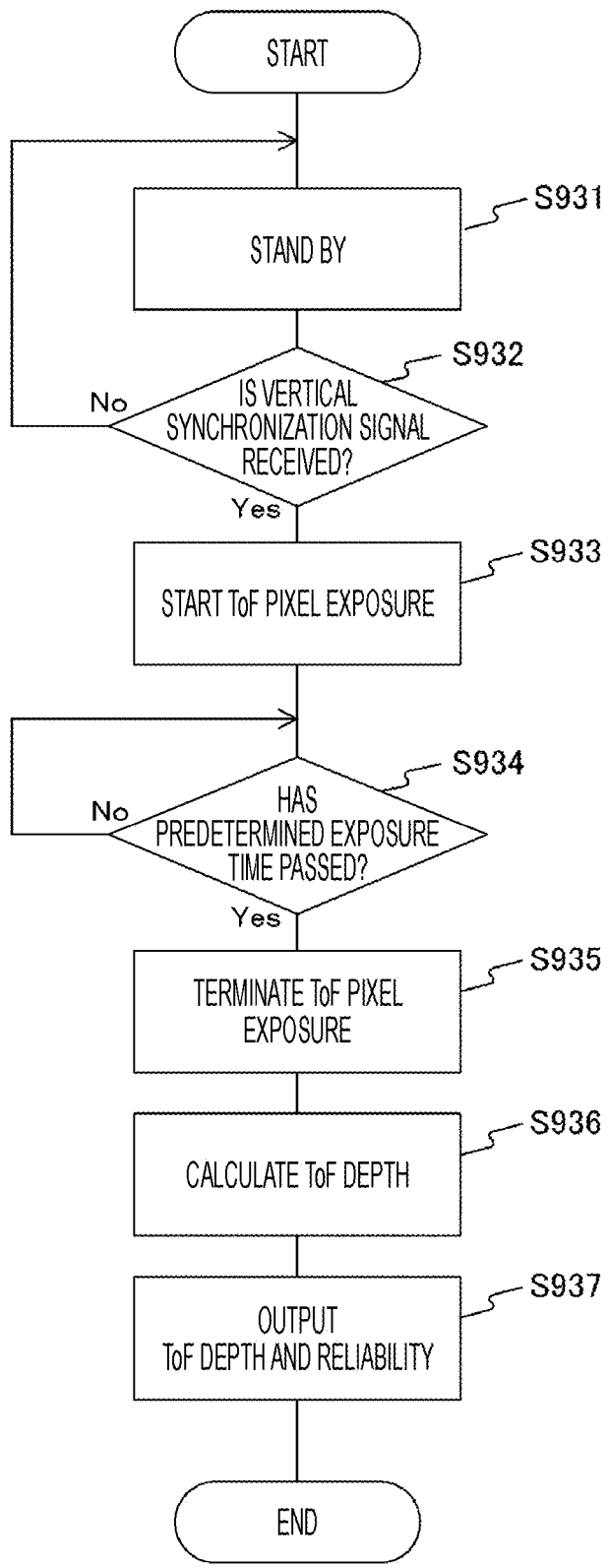
FIG. 11 is a flowchart illustrating an operation procedure example of the ToF camera 110 according to the first embodiment of the present technology.

FIG. 11 is a flowchart illustrating an operation procedure example of the ToF camera 110 according to the first embodiment of the present technology.

Before receiving the vertical synchronization signal (step S932: No), the ToF camera 110 is in a standby state (step S931). When the vertical synchronization signal is input (step S932: Yes), the ToF pixel 111 starts exposure (step S933).

After that, when the exposure time of the ToF camera 110 has passed from the reception timing of the vertical synchronization signal (step S934: Yes), the ToF pixel 111 terminates the exposure (step S935).

Then, the depth calculation unit 113 obtains the phase delay amount from the correlation between the image signal and the modulation signal, and converts the phase delay amount into the depth value representing the depth (step S936). In addition, the depth calculation unit 113 generates the reliability of the depth value, and outputs the depth value and the reliability (step S937).

Figure 12:
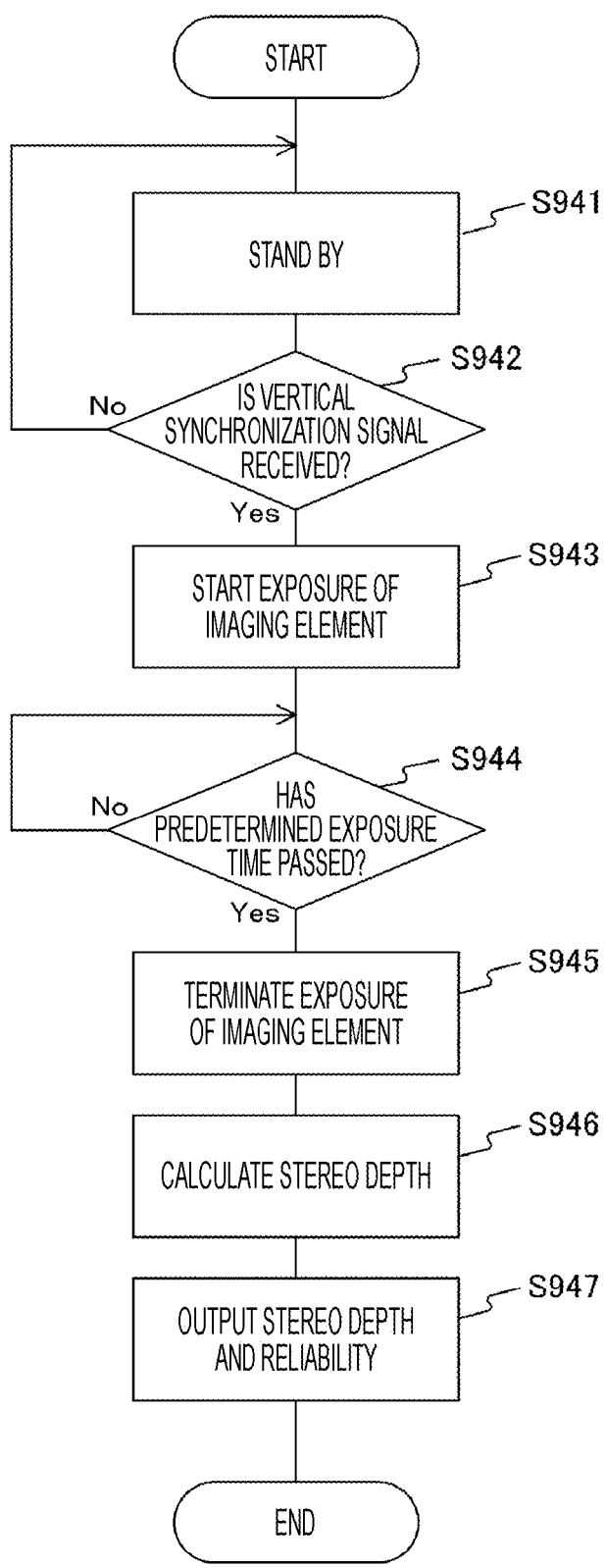
FIG. 12 is a flowchart illustrating an operation procedure example of the stereo camera 120 according to the first embodiment of the present technology.

FIG. 12 is a flowchart illustrating an operation procedure example of the stereo camera 120 according to the first embodiment of the present technology.

Before receiving the vertical synchronization signal (step S942: No), the ToF camera 110 is in a standby state (step S941). When the vertical synchronization signal is input (step S942: Yes), the left-side imaging element 121 and the right-side imaging element 122 start exposure (step S943).

After that, when the exposure time of the stereo camera 120 has passed from the reception timing of the vertical synchronization signal (step S944: Yes), the left-side imaging element 121 and the right-side imaging element 122 terminate the exposure (step S945).

Then, the depth calculation unit 123 calculates the parallax amount at each pixel position from the left and right images, and calculates the distance on the basis of the base line length between the left-side imaging element 121 and the right-side imaging element 122 (step S946). Further, the depth calculation unit 123 generates the reliability of the depth value, and outputs the depth value and the reliability (step S947).

As described above, according to the first embodiment of the present technology, the distance measurement accuracy can be improved by synthesizing the depth values and reliabilities obtained by the ToF camera 110 and the stereo camera 120. The projection light projected from the light source projection unit 130 is intensity-modulated spatial pattern light, and includes both the modulated component necessary for the ToF camera 110 and the spatial pattern necessary for the stereo camera 120. Therefore, since only one light source is used, interference of projection light can be avoided.

2. Second Embodiment

In the above-described first embodiment, the stereo camera 120 is provided in addition to the ToF camera 110. However, a normal monocular camera can be used instead of the stereo camera 120 by imaging one of left and right images with the ToF camera 110. Since the value of Q1+Q2 of the ToF camera 110 is an image capturing a scene itself, the depth value and a normal image are acquired from the ToF camera 110 at the same time. In a second embodiment, a captured image by a ToF camera 110 is one of left and right images, and acquisition of right and left images in combination of the ToF camera 110 and a normal monocular camera is assumed.

Note that an overall configuration as an imaging device is similar to that of the first embodiment, and thus a detailed description is omitted.

Figure 13:
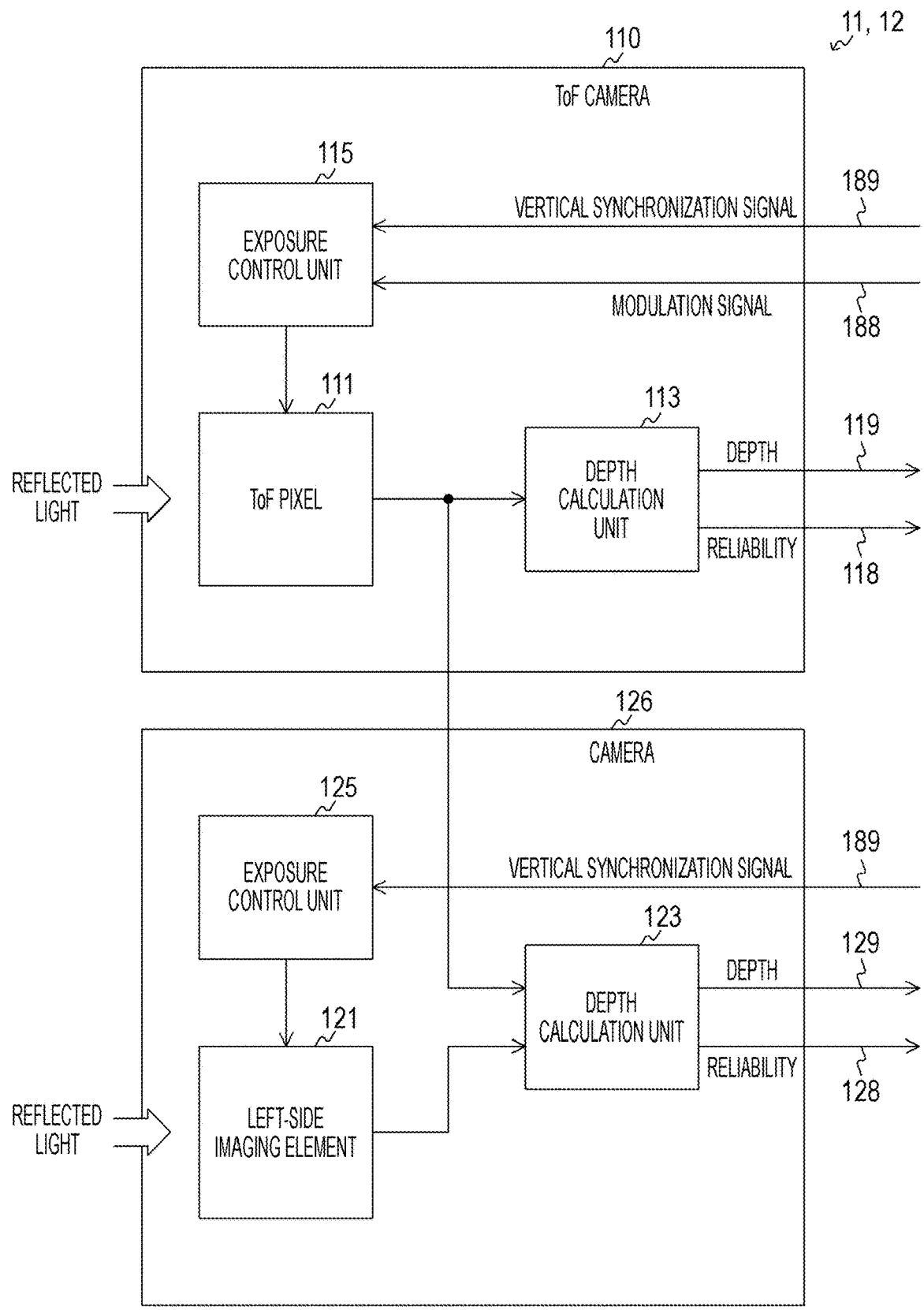
FIG. 13 is a diagram illustrating a configuration example of a ToF camera 110 and a camera 126 according to a second embodiment of the present technology.

FIG. 13 is a diagram illustrating a configuration example of the ToF camera 110 and a camera 126 according to the second embodiment of the present technology. In the second embodiment, as a spatial information distance measurement camera 12, a combination of the ToF camera 110 and the camera 126 is assumed. Note that, as for a time-of-flight distance measurement camera 11, a ToF camera 110 is assumed similarly to the first embodiment.

The camera 126 is a monocular camera and captures a left image of left and right images. At this time, as a right image of the right and left images, one imaged by a ToF pixel 111 of the ToF camera 110 is used. Note that the share of the right and left images is an example, and the left image may be captured by the ToF camera 110 and the right image may be captured by the camera 126.

The camera 126 includes a left-side imaging element 121, a depth calculation unit 123, and an exposure control unit 125.

The exposure control unit 125 controls exposure of the left-side imaging element 121 according to a vertical synchronization signal supplied from a capture control unit 180 via a signal line 189.

The left-side imaging element 121 receives reflected light bouncing off an object 20 and photoelectrically converts the reflected light as an image signal of the left image.

The depth calculation unit 123 calculates a parallax amount at each pixel position from the left and right images obtained from the left-side imaging element 121 and the ToF pixel 111, calculates a distance on the basis of a base line length between the left-side imaging element 121 and the ToF pixel 111, and outputs the calculated distance.

As described above, according to the second embodiment of the present technology, the number of cameras can be reduced and the distance measurement accuracy can be improved similarly to the combination of a ToF camera and a stereo camera by use of the captured image of the ToF camera 110 for one of the right and left images.

3. Third Embodiment

In the first embodiment described above, the stereo camera 120 is assumed as the spatial information distance measurement camera 12. However, another type of camera may be used as long as the camera can measure a distance using spatial information. In a third embodiment, a structure light camera is assumed as a spatial information distance measurement camera 12.

Note that an overall configuration as an imaging device is similar to that of the first embodiment, and thus a detailed description is omitted.

Figure 14:
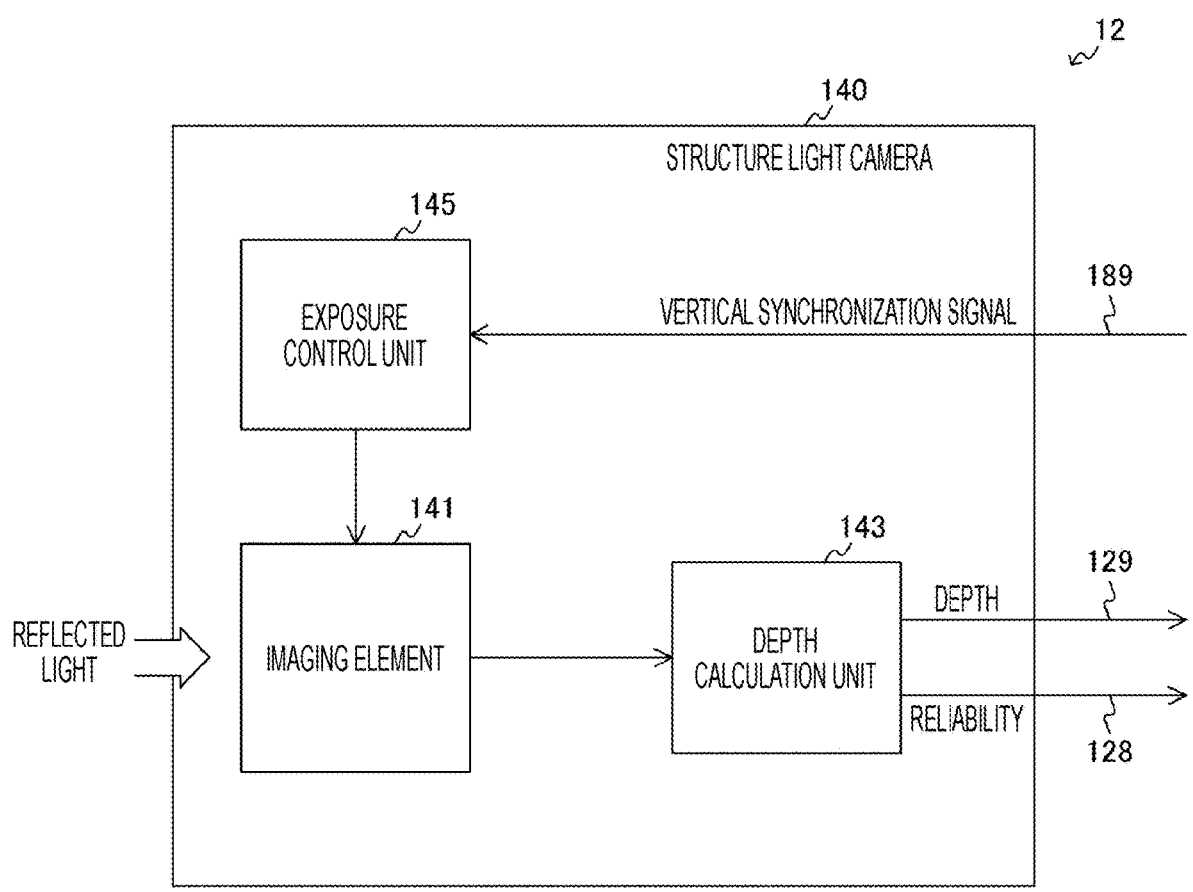
FIG. 14 is a diagram illustrating a configuration example of a structure light camera 140 according to a third embodiment of the present technology.

FIG. 14 is a diagram illustrating a configuration example of a structure light camera 140 according to a third embodiment of the present technology. The structure light camera 140 is a camera that acquires a three-dimensional shape by a camera and pattern projection. The structure light camera 140 includes an imaging element 141, a depth calculation unit 143, and an exposure control unit 145.

The exposure control unit 145 controls exposure of the imaging element 141 according to a vertical synchronization signal supplied from a capture control unit 180 via a signal line 189. The imaging element 141 receives reflected light bouncing off an object 20 and photoelectrically converts the reflected light into an image signal. The depth calculation unit 143 analyzes, in a scene where a known pattern is projected, how the pattern is deformed and where the pattern appears in the captured scene, and calculates a depth distance by triangulation calculation.

By use of the structure light camera 140, the number of cameras can be reduced than a case of using a stereo camera.

As described above, according to the third embodiment of the present technology, the distance measurement accuracy can be improved by synthesizing depth values and reliabilities obtained by the ToF camera 110 and the structure light camera 140.

4. Fourth Embodiment

In the above-described second embodiment, the ToF camera 110 and the camera 126 are combined. However, the camera 126 may be replaced by another ToF camera. In a fourth embodiment, a captured image by a ToF camera 110 is one of left and right images, and acquisition of right and left images in combination of the ToF camera 110 and another ToF camera is assumed.

Note that an overall configuration as an imaging device is similar to that of the first embodiment, and thus a detailed description is omitted.

Figure 15:
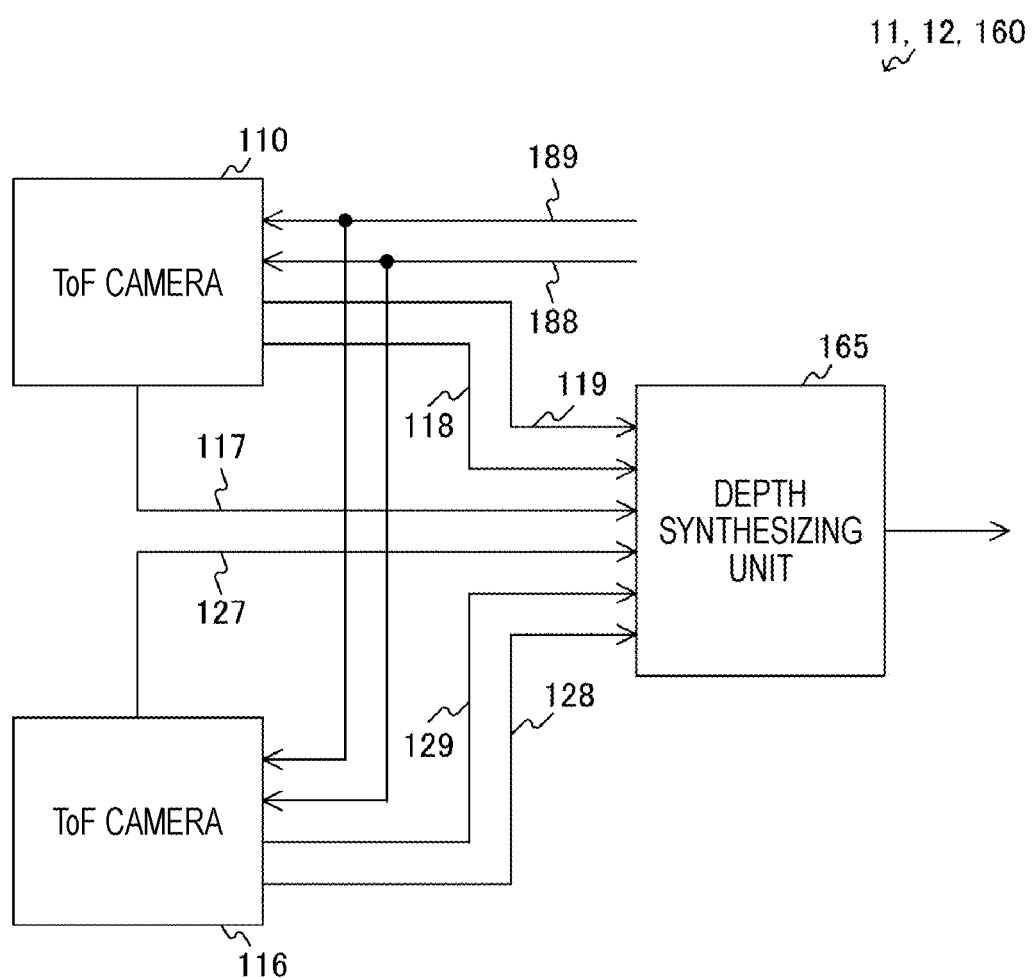
FIG. 15 is a diagram illustrating a configuration example of a ToF camera 110 and a ToF camera 116 according to a fourth embodiment of the present technology.

FIG. 15 is a diagram illustrating a configuration example of a ToF camera 110 and a ToF camera 116 according to a fourth embodiment of the present technology. In the fourth embodiment, as a spatial information distance measurement camera 12, a combination of the ToF camera 110 and a ToF camera 116 is assumed. Note that, as for a time-of-flight distance measurement camera 11, a ToF camera 110 is assumed similarly to the first embodiment.

The ToF camera 116 is a ToF camera different from a ToF camera 110, and images a left image of right and left images. At this time, as a right image of the right and left images, one imaged by a ToF pixel 111 of the ToF camera 110 is used. Note that the share of the right and left images is an example, and the left image may be captured by the ToF camera 110 and the right image may be captured by the ToF camera 116.

Depth values and its reliabilities generated by the ToF cameras 110 and 116 are synthesized by a depth synthesizing unit 165. The depth synthesizing unit 165 can use three sets of the depth value and reliability of the ToF camera 110 alone, the depth value and reliability of the ToF camera 116 alone, and the depth value and reliability of the right and left images, where the right image is captured by the ToF camera 110 and the left image is captured by the ToF camera 116. At this time, depth synthesis can be performed selecting a depth value having the highest reliability for each pixel.

In the fourth embodiment, a dynamic range of brightness can be expanded by changing exposure times between imaging as a ToF camera and imaging as a stereo camera. Further, the dynamic range of distance measurement can be expanded by changing a base line length between the ToF camera 110 and the ToF camera 116. Further, for example, it is conceivable to use the depth values of the ToF cameras 110 and 116 alone for a short distance and to use the depth values by active stereo of the ToF cameras 110 and 116 for a long distance.

As described above, according to the fourth embodiment of the present technology, the distance measurement accuracy can be further improved by synthesizing the depth values and reliabilities obtained by the ToF cameras 110 and 116.

5. Fifth Embodiment

In the third embodiment described above, the ToF camera 110 and the structure light camera 140 are combined, but they may be integrated into one camera. In a fifth embodiment, as a time-of-flight distance measurement camera 11 and a spatial information distance measurement camera 12, an integrated camera is assumed.

Figure 16:
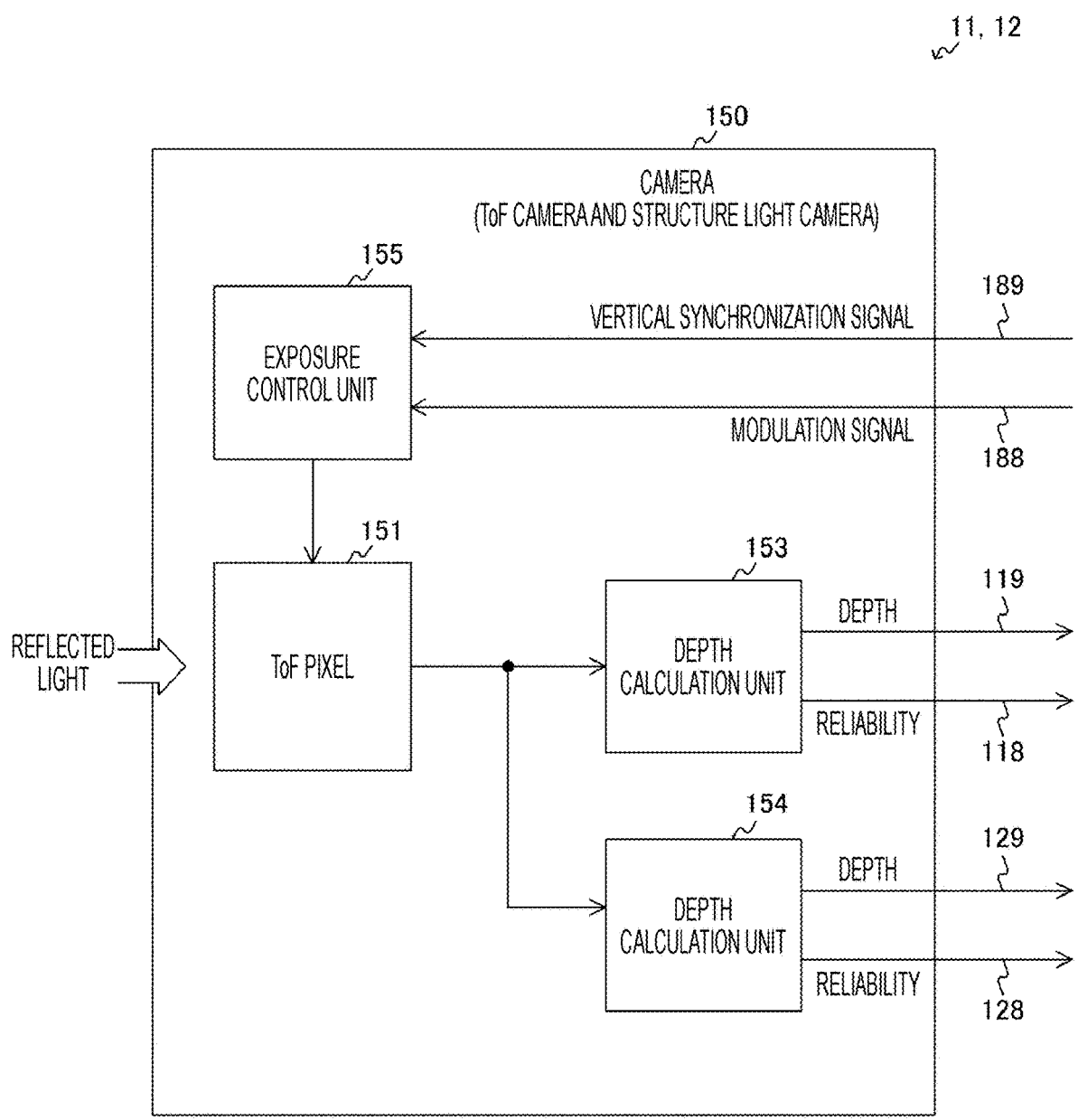
FIG. 16 is a diagram illustrating a configuration example of a camera 150 according to a fifth embodiment of the present technology.

FIG. 16 is a diagram illustrating a configuration example of a camera 150 according to the fifth embodiment of the present technology. This camera 150 is an integration of a ToF camera and a structure light camera. The camera 150 includes a ToF pixel 151, depth calculation units 153 and 154, and an exposure control unit 155.

The exposure control unit 155 controls exposure of a ToF pixel 151 according to a modulation signal and a vertical synchronization signal supplied from a capture control unit 180 via signal lines 188 and 189. The ToF pixel 151 receives modulated reflected light bounding off an object 20 and photoelectrically converts the reflected light as an image signal.

The depth calculation unit 153 obtains a phase delay amount from correlation between the image signal generated by the ToF pixel 151 and a modulation signal, and converts the phase delay amount into a depth value representing the depth. The depth calculation unit 154 analyzes, in a scene where a known pattern is projected, how the pattern is deformed and where the pattern appears in the captured scene, and calculates a depth distance by triangulation calculation. That is, distance measurement using the modulation signal is performed by the depth calculation unit 153 and distance measurement using a pattern is performed by the depth calculation unit 154.

As described above, according to the fifth embodiment of the present technology, both the distance measurement using the modulation signal and the distance measurement using the pattern are performed by the integrated camera, whereby the distance measurement accuracy can be improved while the number of cameras is reduced.

As described above, the embodiments of the present technology have the following advantages.

First of all, interference of projection light can be avoided by superimposing spatial information and temporal information in the light source. The spatial direction (structural light) and the temporal direction (modulation) are independent from each other, and these pieces of information can be used without waste.

Secondly, from the viewpoint of how the reflected light looks, the ToF camera has a low resolution, and thus a pattern of high-resolution structured light cannot be seen and can be handled as being nearly equivalent to surface emission, and distance measurement by high-speed modulation is possible. Since the modulation of the light source is sufficiently fast for active stereo, it is equivalent to projection with constant intensity, and distance measurement using a high resolution spatial pattern is possible.

Thirdly, the share of the measuring range can be changed using the characteristics of the ToF camera and the stereo camera. The ToF camera can measure the distance by short exposure and is hard to saturate even at a short distance, and is thus suitable for taking charge of a front side of the depth value. On the other hand, the active stereo camera is long exposure, high resolution, and high sensitivity, and is thus suitable for taking change of a depth side of the depth value.

Fourthly, demonstration of performance, which is not possible with the ToF camera only by use of the characteristics of the stereo camera. That is, the active stereo enables distance measurement of a surface without texture and can make the range by focusing longer by use of a high-resolution pattern.

6. Application Example to Moving Body

The technology according to the present disclosure (present technology) can be applied to various products. For example, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot and the like.

Figure 17:
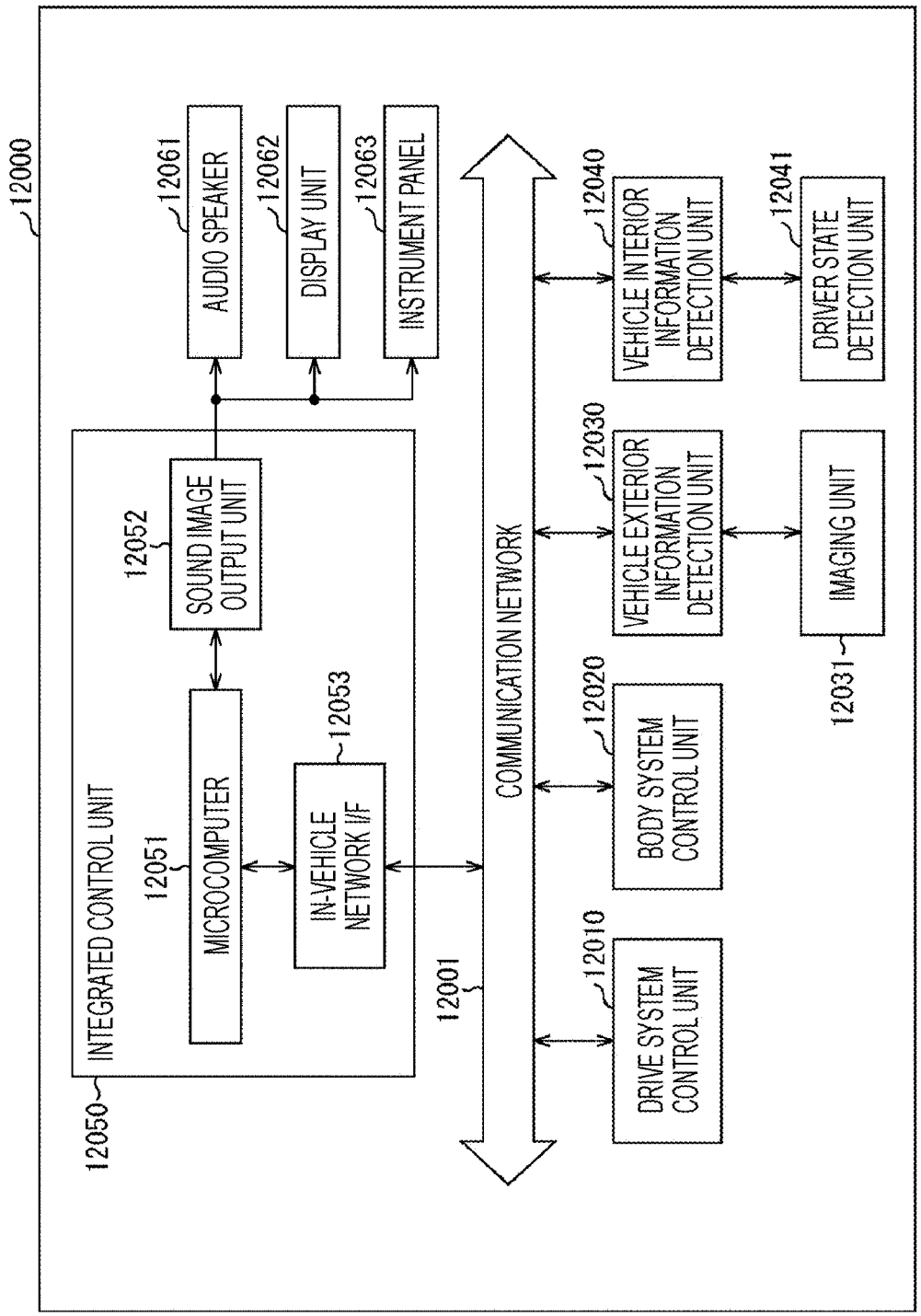
FIG. 17 is a block diagram illustrating an example of a schematic configuration of a vehicle control system.

FIG. 17 is a block diagram illustrating a schematic configuration example of a vehicle control system as an example of a moving body control system to which the technology of the present disclosure is applicable.

A vehicle control system 12000 includes a plurality of electronic control units connected through a communication network 12001. In the example illustrated in FIG. 17, the vehicle control system 12000 includes a drive system control unit 12010, a body system control unit 12020, a vehicle exterior information detection unit 12030, a vehicle interior information detection unit 12040, and an integrated control unit 12050. Further, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like.

The body system control unit 12020 controls operations of devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters or the like on a road surface on the basis of the received image.

The imaging unit 12031 is an optical sensor that receives light and outputs an electrical signal according to a light reception amount of the light. The imaging unit 12031 can output the electrical signal as an image and can output the electrical signal as information of distance measurement. Further, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether the driver falls asleep at the wheel on the basis of the detection information input from the driver state detection unit 12041.

The microcomputer 12051 calculates a control target value of the drive power generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on a vehicular gap, vehicle speed maintaining travel, collision warning of the vehicle, lane out warning of the vehicle and the like.

Further, the microcomputer 12051 controls the drive power generation device, the steering mechanism, the braking device or the like on the basis of the information of a vicinity of the vehicle acquired in the vehicle exterior information detection unit 12030 or the vehicle interior information detection unit 12040 to perform cooperative control for the purpose of automatic driving of autonomous travel without depending on an operation of the driver or the like.

Further, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound and an image to an output device that can visually and aurally notify information to a passenger of the vehicle or an outside of the vehicle. In the example in FIG. 17, as the output device, an audio speaker 12061, a display unit 12062, and an instrument panel 12063 are exemplarily illustrated. The display unit 12062 may include, for example, at least one of an on-board display and a head-up display.

Figure 18:
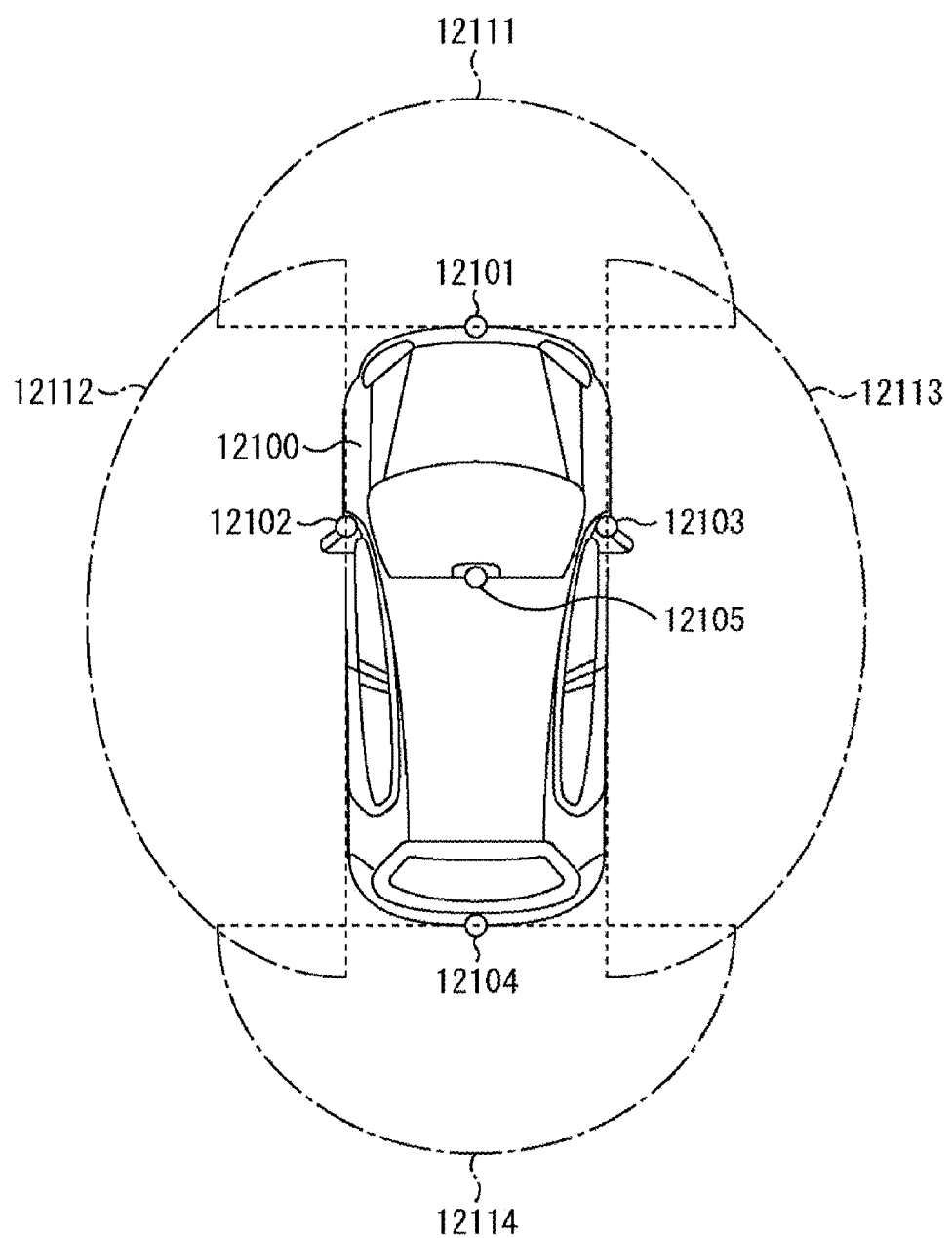
FIG. 18 is an explanatory diagram illustrating an example of installation positions of a vehicle exterior information detection unit and an imaging unit.

FIG. 18 is a diagram illustrating an example of an installation position of the imaging unit 12031.

In FIG. 18, a vehicle 12100 includes, as the imaging unit 12031, imaging units 12101, 12102, 12103, 12104, and 12105.

The imaging units 12101, 12102, 12103, 12104, and 12105 are provided at positions such as a front nose, side mirrors, a rear bumper or a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The front images acquired in the imaging units 12101 and 12105 are mainly used for detection of a leading vehicle, a pedestrian, an obstacle, a traffic light, a traffic sign, a lane or the like.

Note that FIG. 18 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured in the imaging units 12101 to 12104.

At least one of the imaging units 12101 to 12104 may have a function to acquire distance information. For example, at least one of the imaging units 12101 to 12104 may be a stereo camera including a plurality of imaging element s or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract a three-dimensional object closest to the vehicle 12100 on a traveling road and traveling at a predetermined speed (for example, 0 km/h or more) in approximately the same direction as the vehicle 12100 as a leading vehicle. Further, the microcomputer 12051 can set a vehicular gap to be secured from the leading vehicle in advance and perform automatic braking control (including following stop control) and automatic acceleration control (including following start control), and the like. In this way, the cooperative control for the purpose of automatic driving of autonomous travel without depending on an operation of the driver or the like can be performed.

For example, the microcomputer 12051 extracts and classifies three-dimensional object data regarding three-dimensional objects into two-wheeled vehicles, ordinary cars, large vehicles, pedestrians, and other three-dimensional objects such as electric poles, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether a pedestrian exists in the captured images of the imaging units 12101 to 12104, thereby to recognize the pedestrian. The recognition of a pedestrian is performed by a process of extracting characteristic points in the captured images of the imaging units 12101 to 12104, as the infrared camera, for example, and by a process of performing pattern matching processing for the series of characteristic points indicating a contour of an object and discriminating whether the object is a pedestrian. When the microcomputer 12051 determines that a pedestrian exists in the captured images of the imaging units 12101 to 12104 and recognizes the pedestrian, the sound image output unit 12052 controls the display unit 12062 to superimpose and display a square contour line for emphasis on the recognized pedestrian. Further, the sound image output unit 12052 may control the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations.

7. Application Example to Endoscope Surgery System

The technology according to the present disclosure (present technology) can be applied to various products. For example, the technology according to the present disclosure may be applied to an endoscope surgery system.

Figure 19:
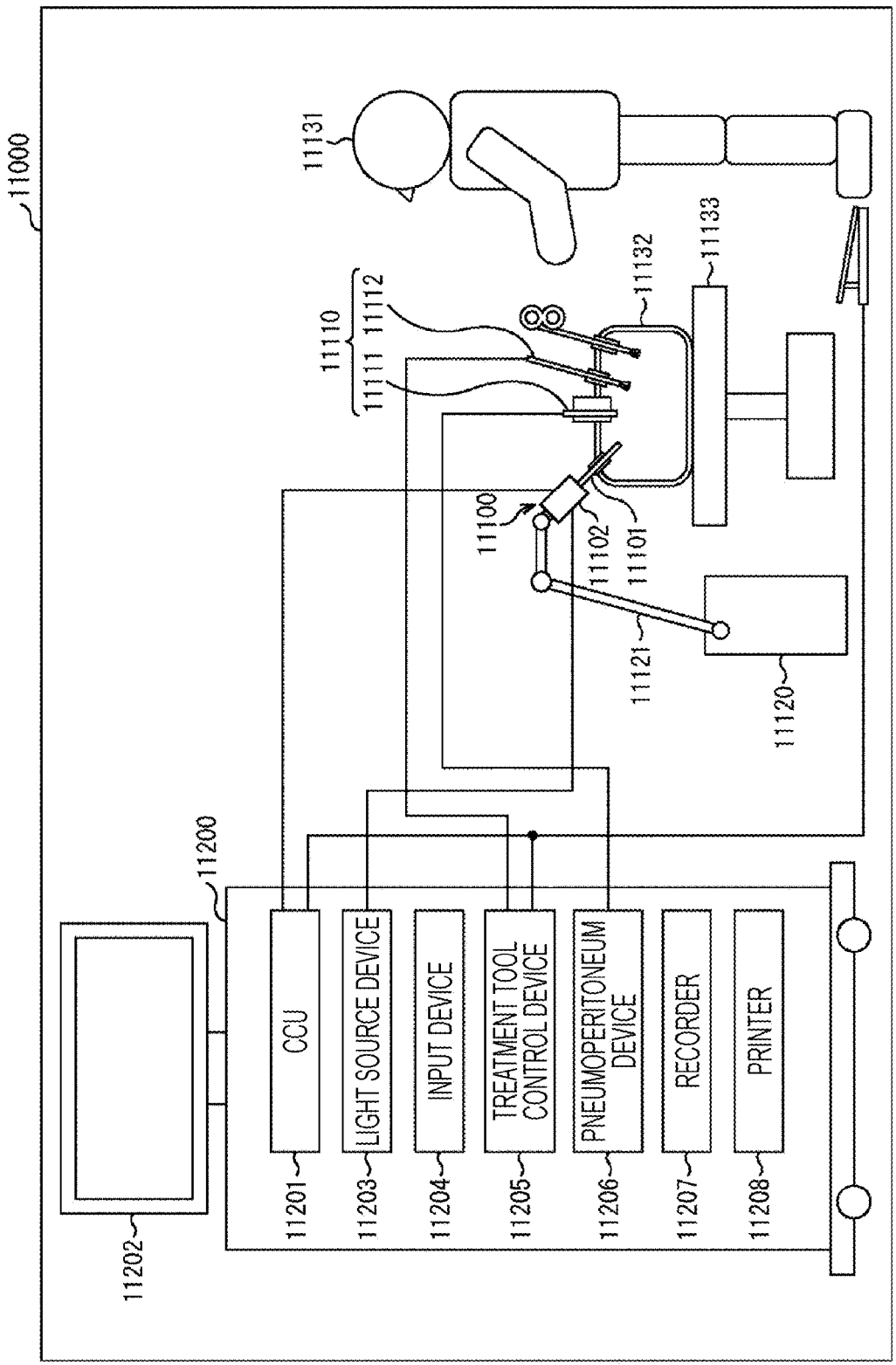
FIG. 19 is a diagram illustrating an example of a schematic configuration of an endoscope surgery system.

FIG. 19 is a diagram illustrating an example of a schematic configuration of an endoscope surgery system to which the technology according to the present disclosure (present technology) is applicable.

FIG. 19 illustrates a state in which an operator (doctor) 11131 is performing an operation on a patient 11132 on a patient bed 11133, using an endoscope surgery system 11000. As illustrated in FIG. 19, the endoscope surgery system 11000 includes an endoscope 11100, other surgical instruments 11110 such as a pneumoperitoneum tube 11111 and an energy treatment tool 11112, a support arm device 11120 that supports the endoscope 11100, and a cart 11200 on which various devices for endoscope surgery are mounted.

The endoscope 11100 includes a lens-barrel 11101 and a camera head 11102. A region having a predetermined length from a distal end of the lens-barrel 11101 is inserted into a body cavity of the patient 11132. The camera head 11102 is connected to a proximal end of the lens-barrel 11101. FIG. 19 illustrates the endoscope 11100 configured as so-called a hard endoscope including the hard lens-barrel 11101. However, the endoscope 11100 may be configured as so-called a soft endoscope including a soft lens-barrel.

An opening portion in which an object lens is fit is provided in the distal end of the lens-barrel 11101. A light source device 11203 is connected to the endoscope 11100, and light generated by the light source device 11203 is guided to the distal end of the lens-barrel 11101 by a light guide extending inside the lens-barrel 11101 and an observation target in the body cavity of the patient 11132 is irradiated with the light through the object lens. Note that the endoscope 11100 may be a direct-viewing endoscope, may be an oblique-viewing endoscope, or may be a side-viewing endoscope.

An optical system and an imaging element are provided inside the camera head 11102, and reflected light (observation light) from the observation target is condensed to the imaging element by the optical system. The observation light is photoelectrically converted by the imaging element, and an electrical signal corresponding to the observation light, that is, an image signal corresponding to an observed image is generated. The image signal is transmitted to a camera control unit (CCU) 11201 as raw data.

The CCU 11201 includes a central processing unit (CPU), a graphics processing unit (GPU), and the like, and generally controls an operation of the endoscope 11100 and a display device 11202. Further, the CCU 11201 receives the image signal from the camera head 11102, and applies various types of image processing for displaying an image based on the image signal, such as developing processing (demosaic processing), to the image signal.

The display device 11202 displays the image based on the image signal to which the image processing has been applied by the CCU 11201, by control of the CCU 11201.

The light source device 11203 is configured from a light source such as a light emitting diode (LED) for example, and supplies irradiation light to the endoscope 11100 in capturing an operation portion or the like.

An input device 11204 is an input interface for the endoscope surgery system 11000. A user can input various types of information and instructions to the endoscope surgery system 11000 through the input device 11204. For example, the user inputs an instruction to change imaging conditions (a type of irradiation light, a magnification, a focal length, and the like) by the endoscope 11100, and the like.

A treatment tool control device 11205 controls driving of the energy treatment tool 11112, for cauterizing or incising a tissue, sealing a blood vessel, and the like. A pneumoperitoneum device 11206 sends a gas into the body cavity of the patient 11132 through the pneumoperitoneum tube 11111 to expand the body cavity for the purpose of securing a field of vision by the endoscope 11100 and a work space for the operator. A recorder 11207 is a device that can record various types of information regarding the surgery. A printer 11208 is a device that can print the various types of information regarding the surgery in various formats such as a test, an image, and a graph.

Note that the light source device 11203 that supplies the irradiation light in capturing the operation portion to the endoscope 11100 can be configured from a white light source configured from an LED, a laser light source, or a combination of the LED and the laser light source, for example. In a case where the white light source is configured from a combination of RGB laser light sources, output intensity and output timing of the respective colors (wavelengths) can be controlled with high accuracy. Therefore, adjustment of white balance of the captured image can be performed in the light source device 11203. Further, in this case, the observation target is irradiated with the laser light from each of the RGB laser light sources in a time division manner, and the driving of the imaging element of the camera head 11102 is controlled in synchronization with the irradiation timing, so that images respectively corresponding to RGB can be captured in a time division manner. According to the method, a color image can be obtained without providing a color filter to the imaging element.

Further, driving of the light source device 11203 may be controlled to change intensity of light to be output every predetermined time. The driving of the imaging element of the camera head 11102 is controlled in synchronization with change timing of the intensity of light and images are acquired in a time division manner, and the images are synthesized, so that a high-dynamic range image without clipped blacks and flared highlights can be generated.

Further, the light source device 11203 may be configured to be able to supply light in a predetermined wavelength band corresponding to special light observation. In the special light observation, for example, so-called narrow band imaging is performed by radiating light in a narrower band than the irradiation light (that is, white light) at the time of normal observation, using wavelength dependence of absorption of light in a body tissue, to capture a predetermined tissue such as a blood vessel in a mucosal surface layer at high contrast. Alternatively, in the special light observation, fluorescence imaging may be performed to obtain an image by fluorescence generated by radiation of exciting light. In the fluorescence imaging, irradiating the body tissue with exciting light to obtain fluorescence from the body tissue (self-fluorescence observation), or injecting a reagent such as indocyanine green (ICG) into the body tissue and irradiating the body tissue with exciting light corresponding to a fluorescence wavelength of the reagent to obtain a fluorescence image can be performed. The light source device 11203 can be configured to be able to supply narrow-band light and/or exciting light corresponding to such special light observation.

Figure 20:
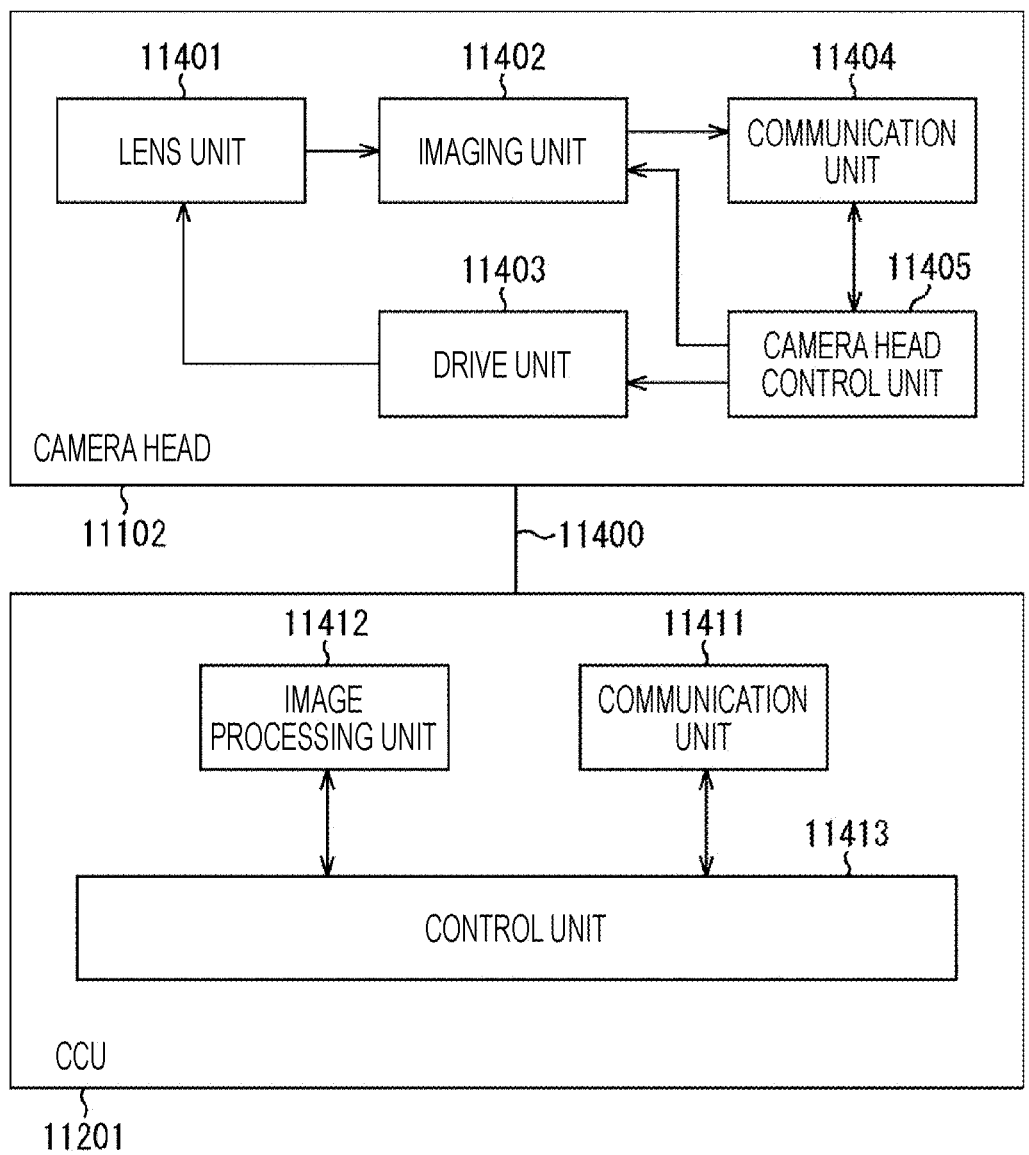
FIG. 20 is a block diagram illustrating an example of functional configurations of a camera head and a CCU.

FIG. 20 is a block diagram illustrating an example of functional configurations of the camera head 11102 and the CCU 11201 illustrated in FIG. 19.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicatively connected with each other by a transmission cable 11400.

The lens unit 11401 is an optical system provided in a connection portion between the camera head 11102 and the lens-barrel 11101. Observation light taken through the distal end of the lens-barrel 11101 is guided to the camera head 11102 and enters the lens unit 11401. The lens unit 11401 is configured from a combination of a plurality of lenses including a zoom lens and a focus lens.

The imaging unit 11402 is configured from an imaging element. The imaging element that configures the imaging unit 11402 may be one imaging element (so-called single imaging element) or may be a plurality of imaging elements (so-called multiple imaging elements). In a case where the imaging unit 11402 is configured from multiple imaging elements, for example, a color image may be obtained by generating image signals respectively corresponding to RGB by the imaging elements and synthesizing the image signals. Alternatively, the imaging unit 11402 may be configured from a pair of imaging elements for respectively obtaining image signals for right eye and for left eye corresponding to three-dimensional (3D) display. With the 3D display, the operator 11131 can more accurately grasp the depth of a biological tissue in the operation portion. Note that, in a case where the imaging unit 11402 is configured from the multiple imaging elements, a plurality of systems of the lens units 11401 may be provided corresponding to the imaging elements.

Further, the imaging unit 11402 may not be necessarily provided in the camera head 11102. For example, the imaging unit 11402 may be provided immediately after the object lens inside the lens-barrel 11101.

The drive unit 11403 is configured from an actuator, and moves the zoom lens and the focus lens of the lens unit 11401 by a predetermined distance along an optical axis by control of the camera head control unit 11405. With the movement, a magnification and a focal point of a captured image by the imaging unit 11402 can be appropriately adjusted.

The communication unit 11404 is configured from a communication device for transmitting or receiving various types of information to or from the CCU 11201. The communication unit 11404 transmits the image signal obtained from the imaging unit 11402 to the CCU 11201 through the transmission cable 11400 as raw data.

Further, the communication unit 11404 receives a control signal for controlling driving of the camera head 11102 from the CCU 11201 and supplies the control signal to the camera head control unit 11405. The control signal includes information regarding the imaging conditions such as information for specifying a frame rate of the captured image, information for specifying an exposure value at the time of imaging, and/or information for specifying the magnification and the focal point of the captured image, for example.

Note that the imaging conditions such as the frame rate, the exposure value, the magnification, and the focal point may be appropriately specified by the user or may be automatically set by the control unit 11413 of the CCU 11201 on the basis of the acquired image signal. In the latter case, so-called an auto exposure (AE) function, an auto focus (AF) function, and an auto white balance (AWB) function are incorporated in the endoscope 11100.

The camera head control unit 11405 controls driving of the camera head 11102 on the basis of the control signal received through the communication unit 11404 from the CCU 11201.

The communication unit 11411 is configured from a communication device for transmitting or receiving various types of information to or from the camera head 11102. The communication unit 11411 receives the image signal transmitted from the camera head 11102 through the transmission cable 11400.

Further, the communication unit 11411 transmits a control signal for controlling driving of the camera head 11102 to the camera head 11102. The image signal and the control signal can be transmitted through telecommunication, optical communication or the like.

The image processing unit 11412 applies various types of image processing to the image signal as a raw data transmitted from the camera head 11102.

The control unit 11413 performs various types of control regarding imaging of the operation portion and the like by the endoscope 11100 and display of the captured image obtained through imaging of the operation portion and the like. For example, the control unit 11413 generates a control signal for controlling driving of the camera head 11102.

Further, the control unit 11413 displays the captured image of the operation portion or the like in the display device 11202 on the basis of the image signal to which the image processing has been applied by the image processing unit 11412. At this time, the control unit 11413 may recognize various objects in the captured image, using various image recognition technologies. For example, the control unit 11413 can recognize a surgical instrument such as forceps, a specific living body portion, blood, mist at the time of use of the energy treatment tool 11112, or the like, by detecting a shape of an edge, a color or the like of an object included in the captured image. The control unit 11413 may superimpose and display various types of surgery support information on the image of the operation portion, in displaying the captured image in the display device 11202. The superimposition and display, and presentation of the surgery support information to the operator 11131 can reduce a burden on the operator 11131 and enables the operator 11131 to reliably proceed with the operation.

The transmission cable 11400 that connects the camera head 11102 and the CCU 11201 is an electrical signal cable corresponding to communication of electrical signals, an optical fiber corresponding to optical communication, or a composite cable thereof.

In the illustrated example, the communication has been performed in a wired manner using the transmission cable 11400. However, the communication between the camera head 11102 and the CCU 11201 may be wirelessly performed.

An example of an endoscope surgery system to which the technology according to the present disclosure is applicable has been described. The technology according to the present disclosure is applicable to the imaging unit 11402 of the camera head 11102, of the above-described configurations.

Note that, here, the endoscope surgery system has been described as an example. However, the technology according to the present disclosure may be applied to microsurgery or the like, for example.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence. However, the present technology is not limited to the embodiments, and can be embodied by application of various modifications to the embodiments without departing from the gist of the present technology.

Further, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray disc (Blu-ray (registered trademark)), or the like can be used.

Note that the effects described in the present specification are merely examples and are not limited, and other effects may be exhibited.

Note that the present technology can have the following configurations.

(1) An imaging device including:
a light source projection unit configured to project intensity-modulated spatial pattern light;
a time-of-flight distance measurement camera configured to measure a distance to an object on the basis of a time of flight of a modulated component included in reflected light of the spatial pattern light from the object;
a spatial information distance measurement camera configured to measure a distance to the object on the basis of spatial information included in the reflected light; and
a depth synthesizing unit configured to synthesize measurement results of the distances in the time-of-flight distance measurement camera and the spatial information distance measurement camera to determine a depth value of each pixel position of an image imaged by the time-of-flight distance measurement camera or the spatial information distance measurement camera.

(2) The imaging device according to (1), in which
the light source projection unit includes
a light source generation unit configured to generate an intensity-modulated light source according to a predetermined modulation signal and a predetermined vertical synchronization signal, and
an optical element configured to deform the light source according to a spatial position to generate the spatial pattern light.

(3) The imaging device according to (1) or (2), in which
each of the time-of-flight distance measurement camera and the spatial information distance measurement camera generates a depth value of each pixel position and reliability of the depth value as the measurement result, and
the depth synthesizing unit determines the depth value of each pixel position on the basis of magnitude of the reliability in the measurement result.

(4) The imaging device according to (3), in which
the depth synthesizing unit selects a depth value having highest reliability in the measurement results, for each pixel, to determine the depth value of each pixel position.

(5) The imaging device according to any one of (1) to (4), in which
the spatial information distance measurement camera is a stereo camera including two right and left imaging elements, and configured to measure the distance to the object on the basis of a parallax amount in each pixel position obtained from right and left images obtained from the two imaging elements regarding the spatial information included in the reflected light, and a base line length of the two imaging elements.

(6) The imaging device according to any one of (1) to (4), in which
the spatial information distance measurement camera is a structure light camera configured to measure the distance to the object on the basis of triangulation calculation regarding the spatial information included in the reflected light.

(7) The imaging device according to any one of (1) to (4), further including:
a second time-of-flight distance measurement camera configured to measure a distance to an object on the basis of a time of flight of a modulated component included in reflected light of the spatial pattern light from the object, in which
the time-of-flight distance measurement camera and the second time-of-flight distance measurement camera are operated as the spatial information distance measurement camera.

(8) The imaging device according to (7), in which
each of the time-of-flight distance measurement camera and the second time-of-flight distance measurement camera generates a depth value of each pixel position and reliability of the depth value as the measurement result,
the time-of-flight distance measurement camera and the second time-of-flight distance measurement camera generate a depth value of each pixel position and reliability of the depth value as the measurement result as the spatial information distance measurement camera, and
the depth synthesizing unit selects a depth value having highest reliability in the measurement results of the time-of-flight distance measurement camera and the second time-of-flight distance measurement camera and the measurement result as the spatial information distance measurement camera, for each pixel, to determine the depth value of each pixel position.

(9) The imaging device according to any one of (1) to (4), in which
the time-of-flight distance measurement camera and the spatial information distance measurement camera are an integrated camera that measures the distance to the object on the basis of the time of flight of a modulated component included in reflected light, and measure the distance to the object on the basis of triangulation calculation regarding the spatial information included in the reflected light.

REFERENCE SIGNS LIST

11 Time-of-flight distance measurement camera
12 Spatial information distance measurement camera
20 Object
100 Imaging device
110, 116 ToF camera
111 ToF pixel
113 Depth calculation unit
115 Exposure control unit
120 Stereo camera
121 Left-side imaging element
122 Right-side imaging element
123 Depth calculation unit
125 Exposure control unit
126 Camera
130 Light source projection unit
131 Light source generation unit
133 Optical element
135 Light source control unit
140 Structure light camera
141 Imaging element
143 Depth calculation unit
145 Exposure control unit
150 Camera (ToF camera and structure light camera)
151 ToF pixel
153, 154 Depth calculation unit
155 Exposure control unit
160, 165 Depth synthesizing unit
161, 162 Coordinate transformation unit
163 Depth synthesis processing unit
170 Input receiving unit
180 Capture control unit
181 Vertical synchronization generation unit
182 Modulation signal generation unit

The invention claimed is:

1. An imaging device comprising:
a light source projection unit configured to project intensity-modulated spatial pattern light;
a first time-of-flight distance measurement camera configured to measure a distance to an object on the basis of a time of flight of a modulated component included in reflected light of the spatial pattern light from the object;
a spatial information distance measurement camera configured to measure a distance to the object on the basis of spatial information included in the reflected light;
a depth synthesizing unit configured to synthesize measurement results of the distances in the first time-of-flight distance measurement camera and the spatial information distance measurement camera to determine a depth value of each pixel position of an image imaged by the first time-of-flight distance measurement camera or the spatial information distance measurement camera; and
a second time-of-flight distance measurement camera configured to measure a distance to the object on the basis of the time of flight of the modulated component included in reflected light of the spatial pattern light from the object, wherein
the first time-of-flight distance measurement camera and the second time-of-flight distance measurement camera are operated with the spatial information distance measurement camera; wherein
each of the first time-of-flight distance measurement camera and the second time-of-flight distance measurement camera generates a depth value of each pixel position and reliability of the depth value as the measurement result,
the first time-of-flight distance measurement camera and the second time-of-flight distance measurement camera generate a depth value of each pixel position and reliability of the depth value as the measurement result as the spatial information distance measurement camera, and
the depth synthesizing unit selects a depth value having highest reliability in the measurement results of the first time-of-flight distance measurement camera and the second time-of-flight distance measurement camera and the measurement result as the spatial information distance measurement camera, for each pixel, to determine the depth value of each pixel position.

2. The imaging device according to claim 1, wherein the light source projection unit includes
a light source generation unit configured to generate an intensity-modulated light source according to a predetermined modulation signal and a predetermined vertical synchronization signal, and
an optical element configured to deform the light source according to a spatial position to generate the spatial pattern light.

3. The imaging device according to claim 1, wherein the depth synthesizing unit determines the depth value of each pixel position on the basis of magnitude of the reliability in the measurement result.

4. The imaging device according to claim 3, wherein the depth synthesizing unit selects a depth value having highest reliability in the measurement results, for each pixel, to determine the depth value of each pixel position.

5. The imaging device according to claim 1, wherein the first time-of-flight distance measurement camera and the spatial information distance measurement camera are an integrated camera that measures a distance to the object on the basis of the time of flight of the modulated component included in reflected light, and measure a distance to the object on the basis of triangulation calculation regarding the spatial information included in the reflected light.

* * * * *